(12) United States Patent
Babaei et al.

(10) Patent No.: US 10,448,423 B2
(45) Date of Patent: Oct. 15, 2019

(54) DATA MULTIPLEXING IN A WIRELESS DEVICE AND WIRELESS NETWORK

(71) Applicant: Ofinno Technologies, LLC, Herndon, VA (US)

(72) Inventors: Alireza Babaei, Fairfax, VA (US); Esmael Dinan, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 15/928,913

(22) Filed: Mar. 22, 2018

(65) Prior Publication Data

US 2018/0279358 A1   Sep. 27, 2018

Related U.S. Application Data

(60) Provisional application No. 62/474,944, filed on Mar. 22, 2017.

(51) Int. Cl.
*H04W 72/14* (2009.01)
*H04W 72/04* (2009.01)
*H04W 72/12* (2009.01)

(52) U.S. Cl.
CPC ....... *H04W 72/14* (2013.01); *H04W 72/0453* (2013.01); *H04W 72/1242* (2013.01); *H04W 72/1289* (2013.01)

(58) Field of Classification Search
None
See application file for complete search history.

(56) References Cited

U.S. PATENT DOCUMENTS 8,243,697 B2 * 8/2012 Lee .................. H04W 28/06
370/336
9,100,144 B2 * 8/2015 Kim .................. H04L 5/0023

OTHER PUBLICATIONS

3GPP TS 36.211 V14.1.0 (Dec. 2016); 3rd Generation Partnership Project; Technical Specification Group Radio Access Network; Evolved Universal Terrestrial Radio Access (E-UTRA); Physical channels and modulation (Release 14).
3GPP TS 36.212 V14.1.0 (Dec. 2016); 3rd Generation Partnership Project; Technical Specification Group Radio Access Network; Evolved Universal Terrestrial Radio Access (E-UTRA); Multiplexing and channel coding (Release 14).
(Continued)

*Primary Examiner* — Hong S Cho
(74) *Attorney, Agent, or Firm* — David Grossman; Kavon Nasabzadeh; Philip Smith

(57) ABSTRACT

A wireless device receives from a base station, message(s) comprising: first configuration parameters of cell(s) and second configuration parameters of logical channel(s). Uplink grant(s) indicating radio resources are received on the cell(s) where the uplink grant(s) are received in different transmission time intervals; and the radio resources comprise resource block(s). First uplink grant(s) are selected in response to the first uplink grant(s) being received during coinciding time durations that the wireless device is configured to monitor a control channel on the cell(s). Data from logical channel(s) are multiplexed into transport blocks by processing together the first uplink grant(s). Transport block(s) are transmitted via resource blocks corresponding to the first uplink grant(s).

20 Claims, 25 Drawing Sheets

(56) References Cited

OTHER PUBLICATIONS

3GPP TS 36.213 V14.1.0 (Dec. 2016); 3rd Generation Partnership Project; Technical Specification Group Radio Access Network; Evolved Universal Terrestrial Radio Access (E-UTRA); Physical layer procedures (Release 14).
3GPP TS 36.300 V14.1.0 (Dec. 2016); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.321 V14.1.0 (Dec. 2016); 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331; V14.1.0 (Dec. 2016)3rd Generation Partnership Project; Technical Specification Group Radio Access Network; Evolved Universal Terrestrial Radio Access (E-UTRA); Radio Resource Control (RRC); Protocol specification (Release 14).
R2-1700039; 3GPP TSG-RAN WG2 NR Ad Hoc; Spokane, USA, Jan. 17-19, 2017; Source: vivo; Title: Discussion on mapping between MAC and multiple TTI lengths; Agenda Item: 3.2.1.2; Document for: Discussion and Decision.
R2-1700049; 3GPP TSG-RAN WG2 NR Ad Hoc; Spokane, USA, Jan. 17-19, 2017; Agenda Item: 3.2.1.2; Source: OPPO; Title: Logical channel multiplexing and prioritization in NR; Document for: Discussion and Decision.
R2-1700083; 3GPP TSG-RAN2 Meeting #Ad hoc; Spokane, Washington, USA, Jan. 17-19, 2017; Agenda item: 3.2.1.2; Source: Huawei, HiSilicon; Title: MAC Support of Multiple Numerologies; Document for: Discussion and Decision.
R2-1700085; 3GPP TSG-RAN WG2 Ad Hoc; Spokane, USA, Jan. 17-19, 2017; Agenda item: 3.2.1.2; Source: Huawei, HiSilicon; Title: LCP with Multiple Numerologies; Document for: Discussion and Decision.
R2-1700115; 3GPP TSG-RAN WG2 NR Ad Hoc; Update of R2-168232; Spokane, Washington, USA, Jan. 17-19, 2017; Agenda Item: 3.2.1.3 (QoS); Source: Fujitsu; Title: MAC function for URLLC support; Document for: Decision.
R2-1700198; 3GPP TSG-RAN WG2 NR Ad Hoc; Spokane, USA, Jan. 17-19, 2017; Source: CATT; Title: NR LCP procedure; Agenda Item: 3.2.1.2; Document for: Discussion and Decision.
R2-1700229; 3GPP TSG-RAN WG2 NR; Spokane, USA, Jan. 17-19, 2017; Agenda Item: 3.2.1.2; Source: MediaTek Inc; Title: Design of NR MAC layer to support multiple numerologies; Document for: Discussion and decision.
R2-1700236; 3GPP TSG-RAN WG2 NR Ad Hoc; Spokane, Washington Jan. 17-19, 2017; Agenda Item: 3.2.1.2; Source: InterDigital Communications; Title: LCP and Scheduling Aspects for Multiple Numerologies; Document for: Discussion, Decision.
R2-1700252; 3GPP TSG-RAN WG2 NR Adhoc; Spokane, USA, Jan. 17-19, 2017; Agenda item: 3.2.1.4; Source: Nokia, Alcatel-Lucent Shanghai Bell; Title: Logical channel to numerologies/TTI length mapping; WID/SID: FS_NR_newRAT—Release 14; Document for: Discussion and Decision.
R2-1700285; 3GPP TSG-RAN WG2 NR Ad Hoc; Spokane, USA, Jan. 17-Jan. 19, 2017; Agenda item: 3.2.1.4 (FS_NR_newRAT); Source: LG Electronics Inc.; Title: UL grant and MAC PDU construction; Document for: Discussion and Decision.
R2-1700334; 3GPP TSG-RAN WG2 NR Ad-hoc; Spokane, Washington, USA, Jan. 17-19, 2017; Agenda item: 3.2.1.4; Source: Intel Corporation; Title: Logical channels and transport channels and their mapping in NR; Document for: Discussion and Decision.
R2-1700408; 3GPP TSG-RAN WG2 NR Ad Hoc; Spokane, USA, Jan. 17-19, 2017; Agenda Item: 3.2.1.2; Source: Ericsson; Title: Modelling of MAC with multiple numerologies; Document for: Discussion, Decision.
R2-1700426; 3GPP TSG-RAN WG2 NR Ad Hoc; Spokane, USA, Jan. 17-19, 2017; Agenda Item: 3.2.1.2 (FS_NR_newRAT); Source: LG Electronics Inc.; Title: Numerology aspect in MAC; Document for: Discussion and Decision.
R2-17xxxxx; 3GPP TSG-RAN WG2 NR Adhoc Meeting; Spokane, USA, Jan. 17-19, 2017; Agenda Item: 3.2.1.2; Source: III; Title: LCP procedure support of URLLC traffic in different numerologies; Document for: Discussion, Decision.

* cited by examiner

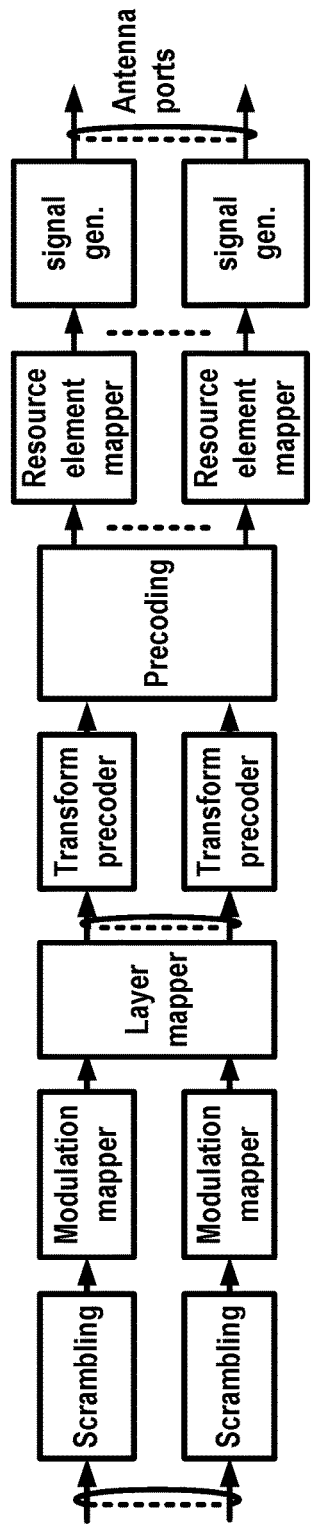
FIG. 4A
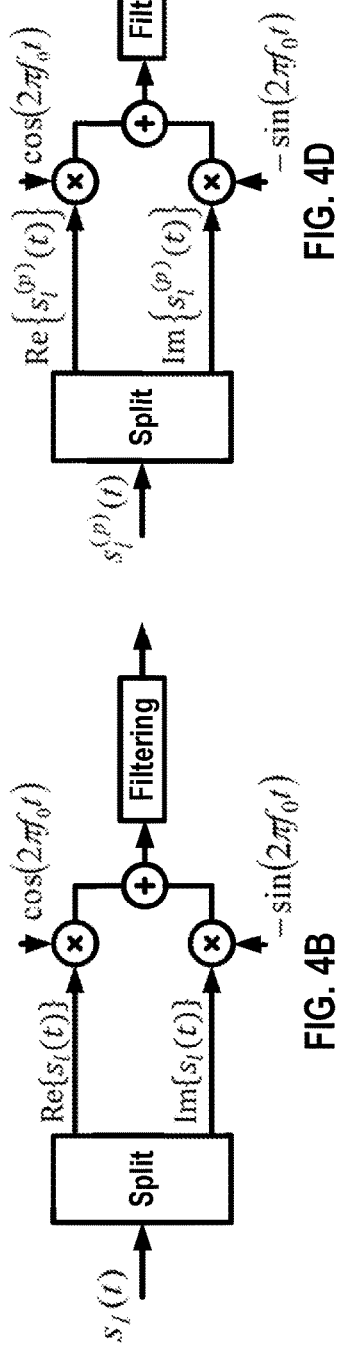
FIG. 4B
FIG. 4D
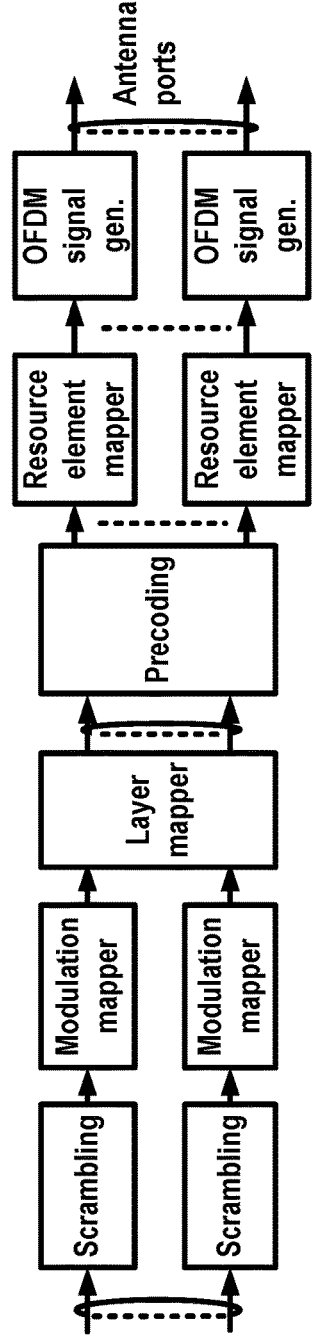
FIG. 4C

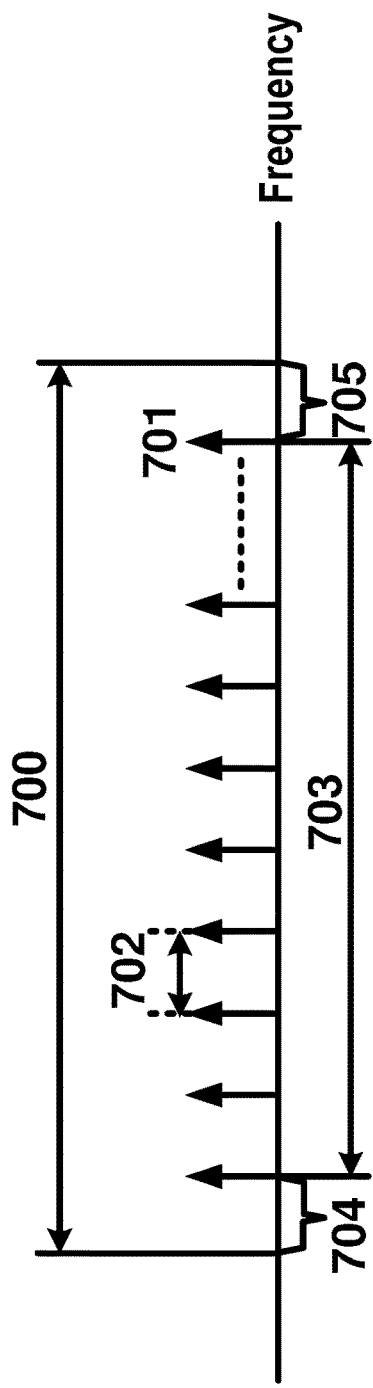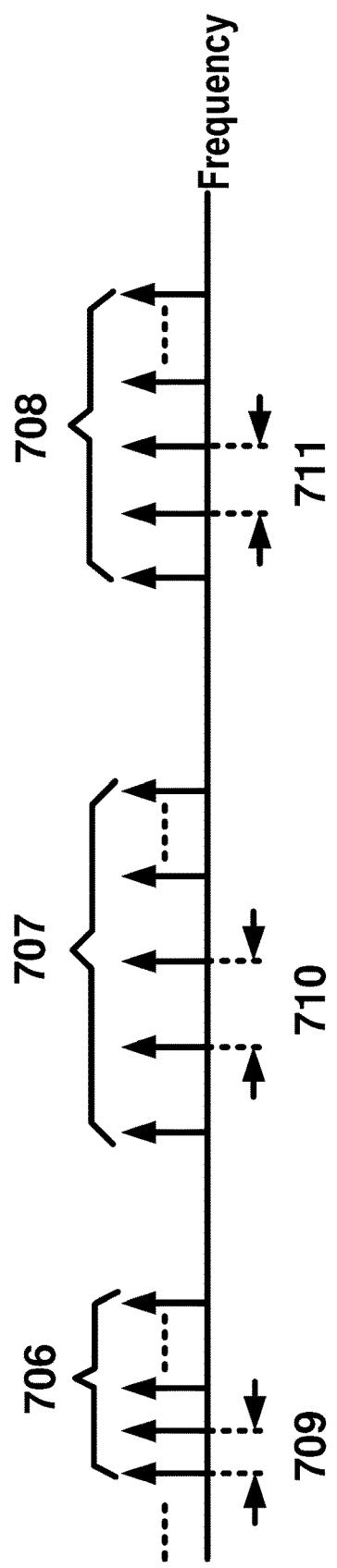

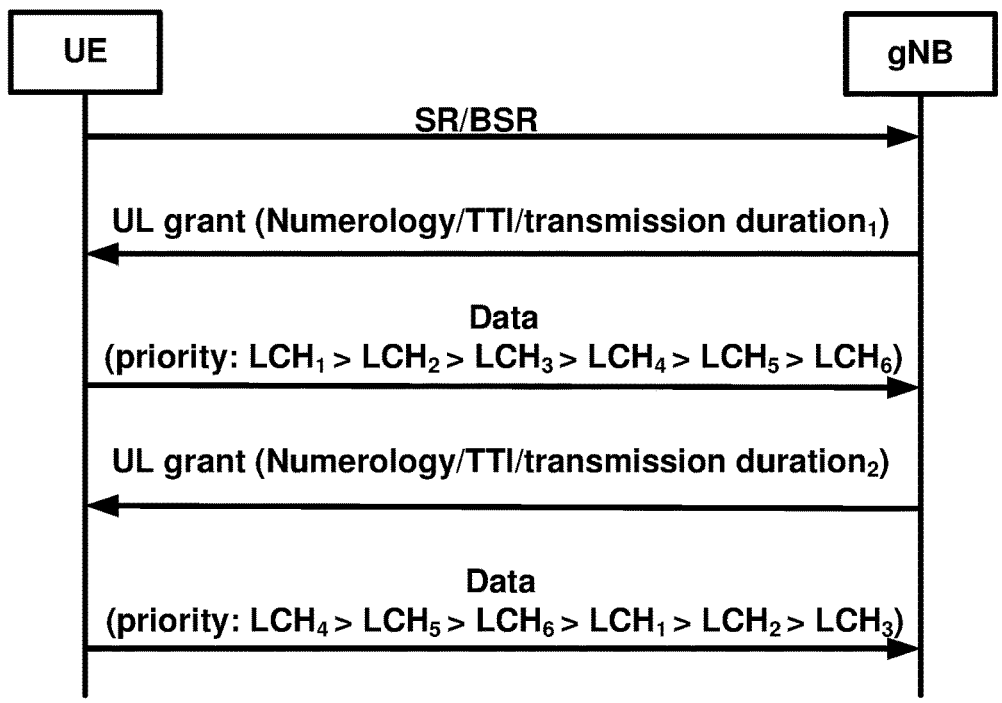
Example 1
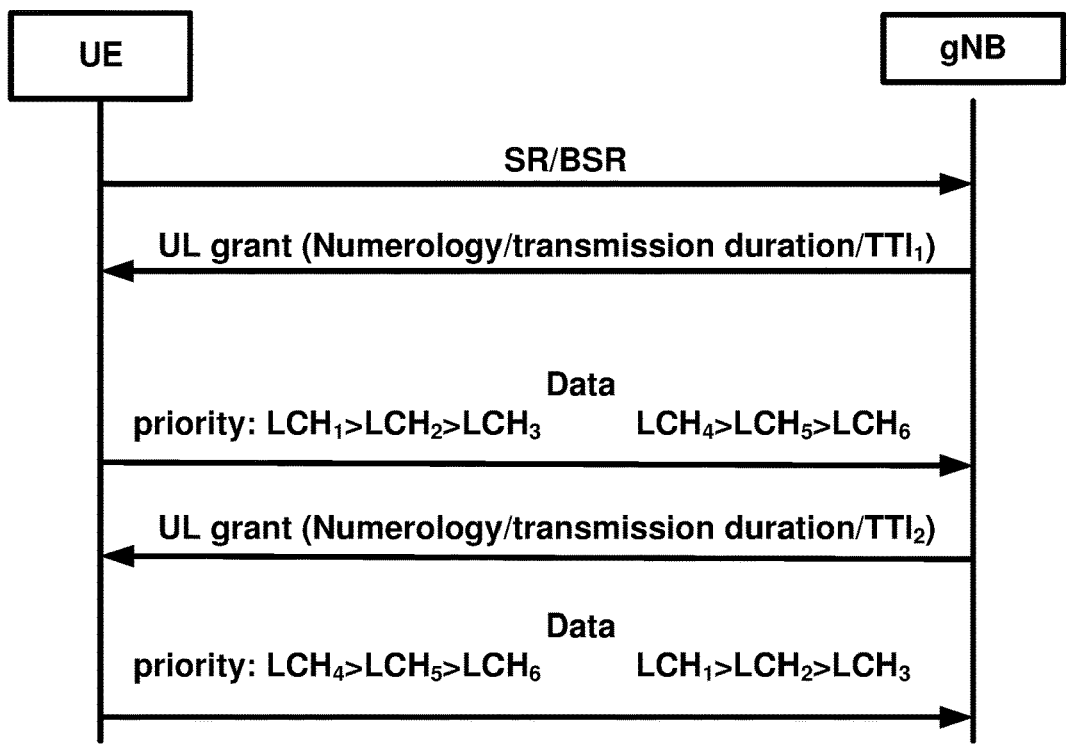
Example 2
FIG. 16

DATA MULTIPLEXING IN A WIRELESS DEVICE AND WIRELESS NETWORK

CROSS-REFERENCE TO RELATED APPLICATIONS

This application claims the benefit of U.S. Provisional Application No. 62/474,944, filed Mar. 22, 2017, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

FIG. 16 is a diagram of an example data scheduling as per an aspect of an embodiment of the present disclosure.

DETAILED DESCRIPTION OF EMBODIMENTS

Figure 1:
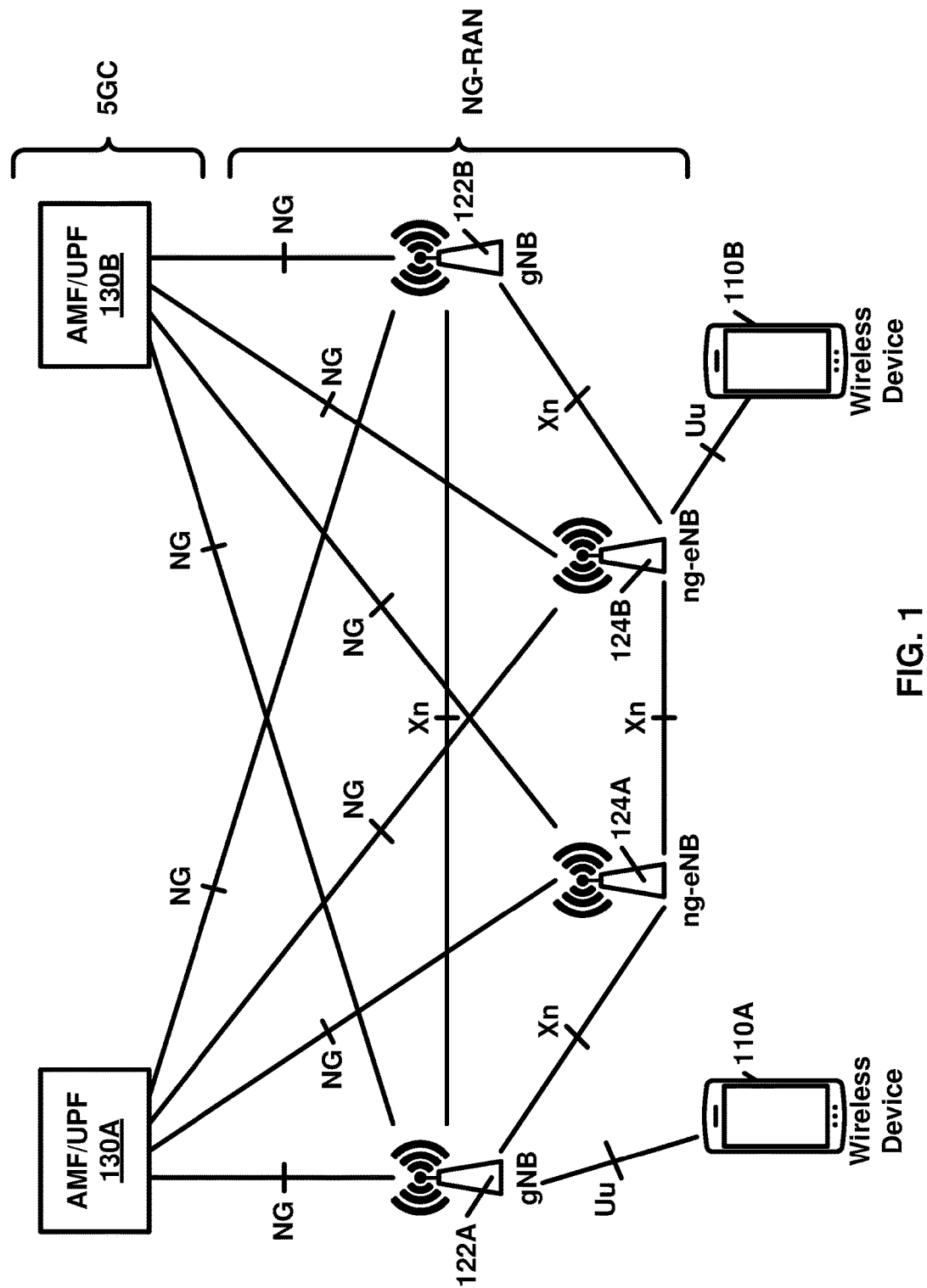
FIG. 1 is a diagram of an example RAN architecture as per an aspect of an embodiment of the present disclosure.

Example embodiments of the present disclosure enable operation of data multiplexing. Embodiments of the technology disclosed herein may be employed in the technical field of multicarrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g.

110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
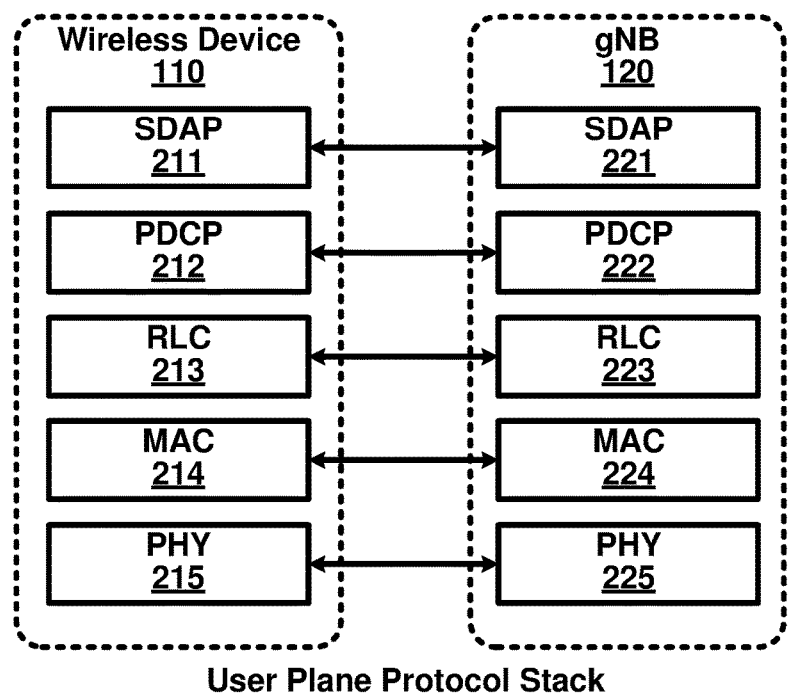
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TB s) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
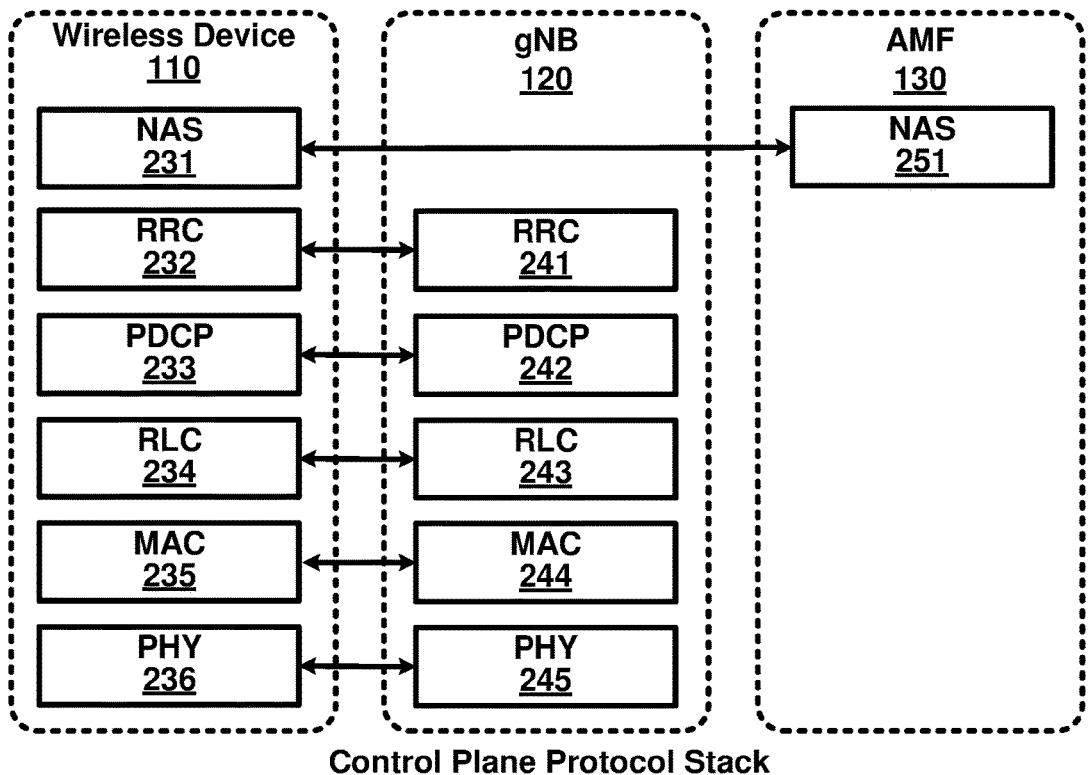
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
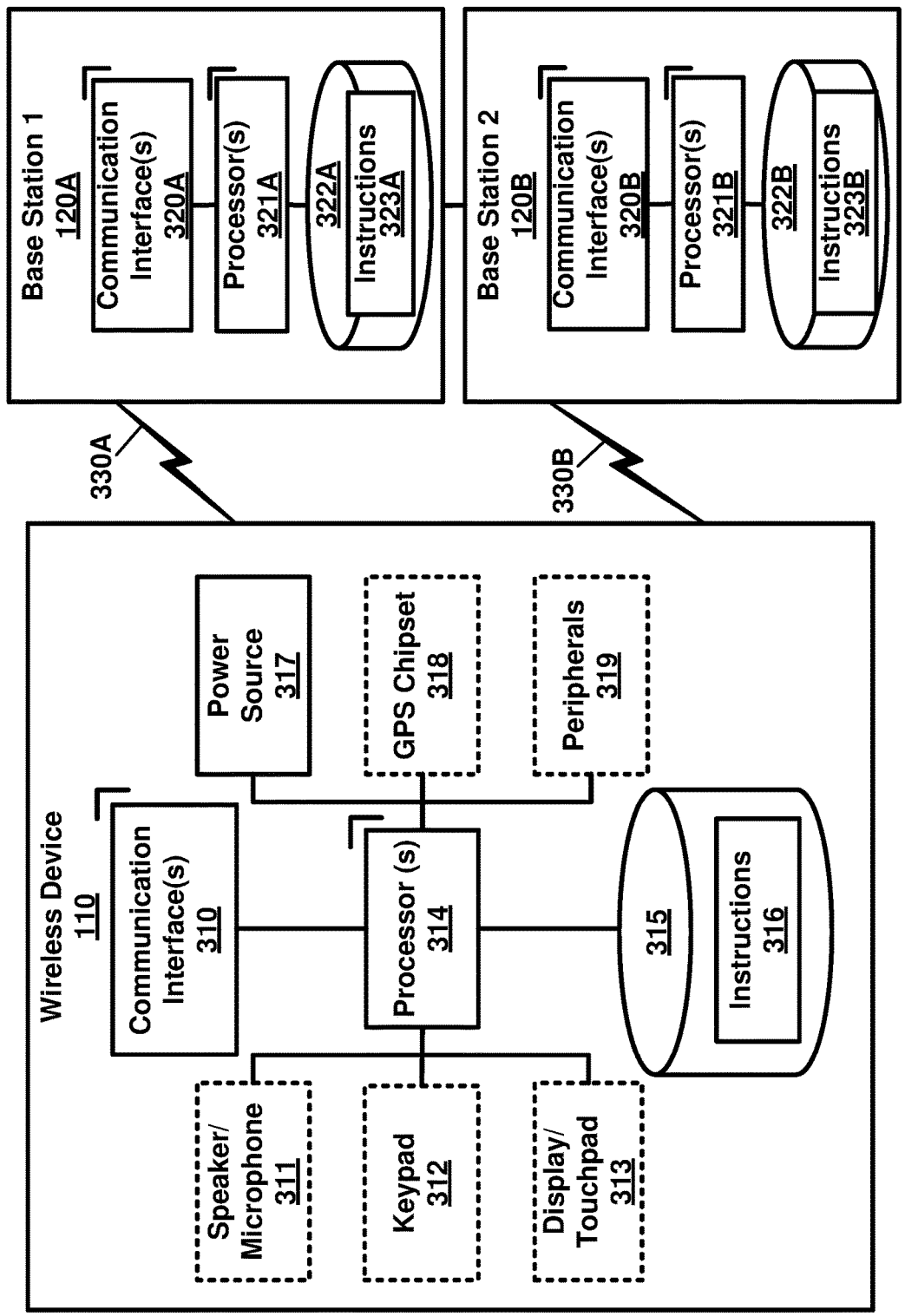
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1).

Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier- Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
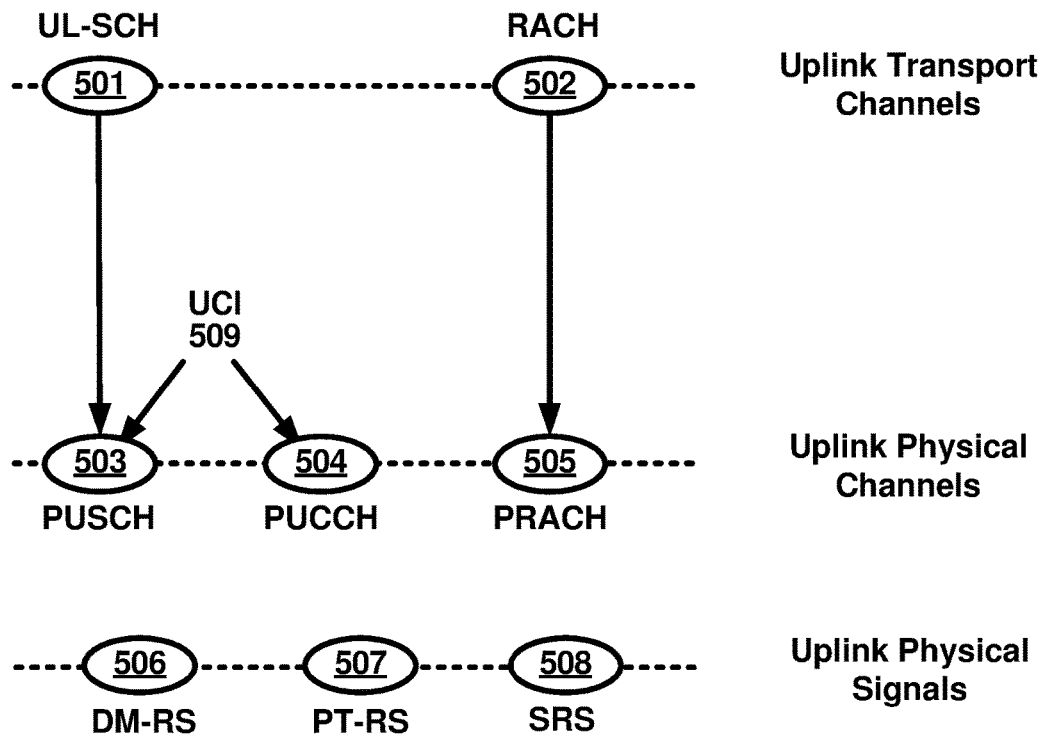
FIG. 5A is a diagram of an example uplink channel mapping and example uplink physical signals as per an aspect of an embodiment of the present disclosure.
Figure 5B:
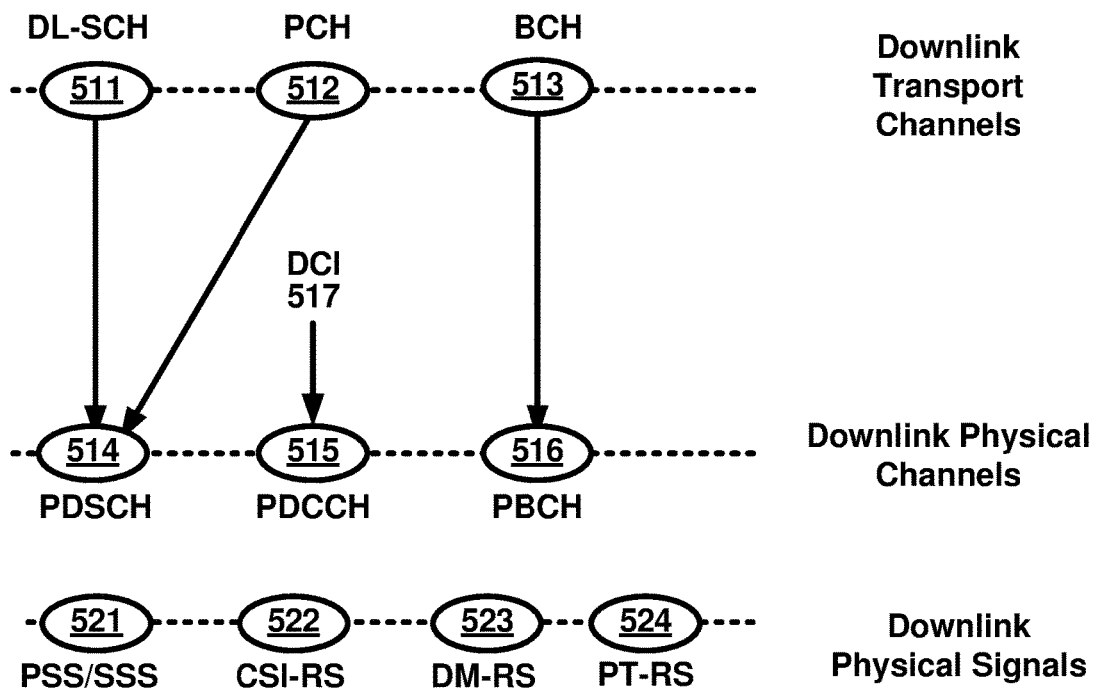
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (minislot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi colocation for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semistatistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
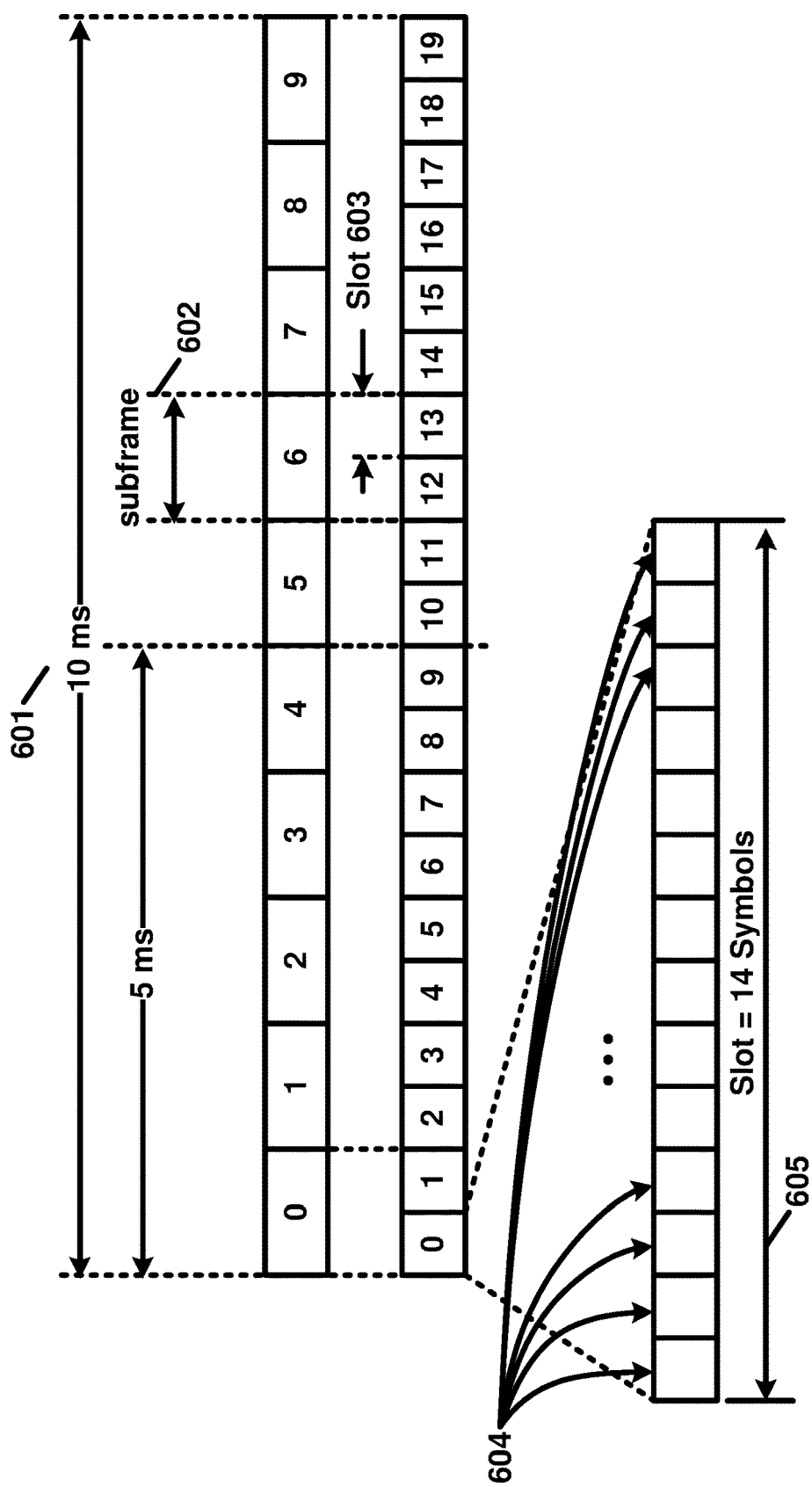
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
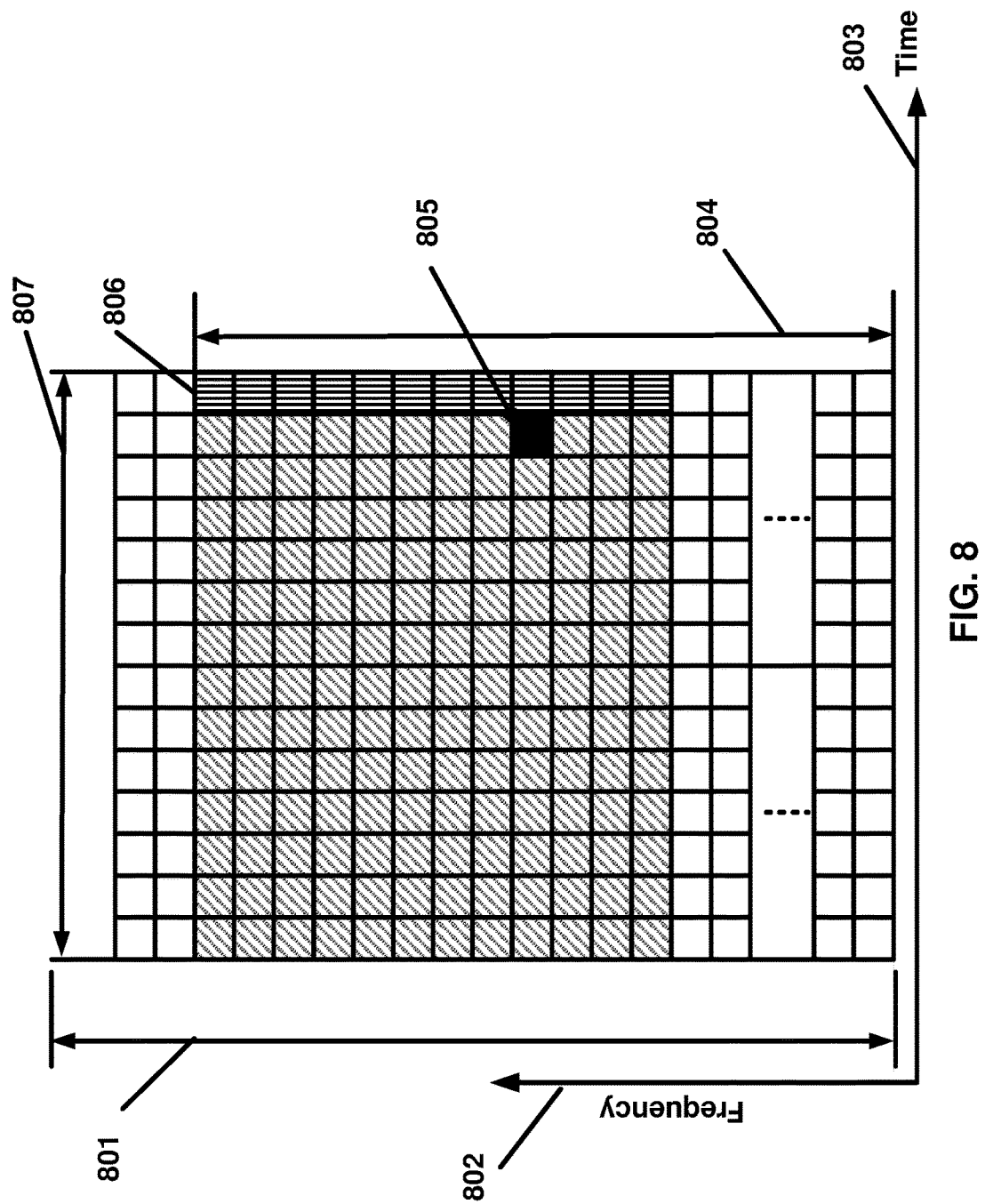
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 9:
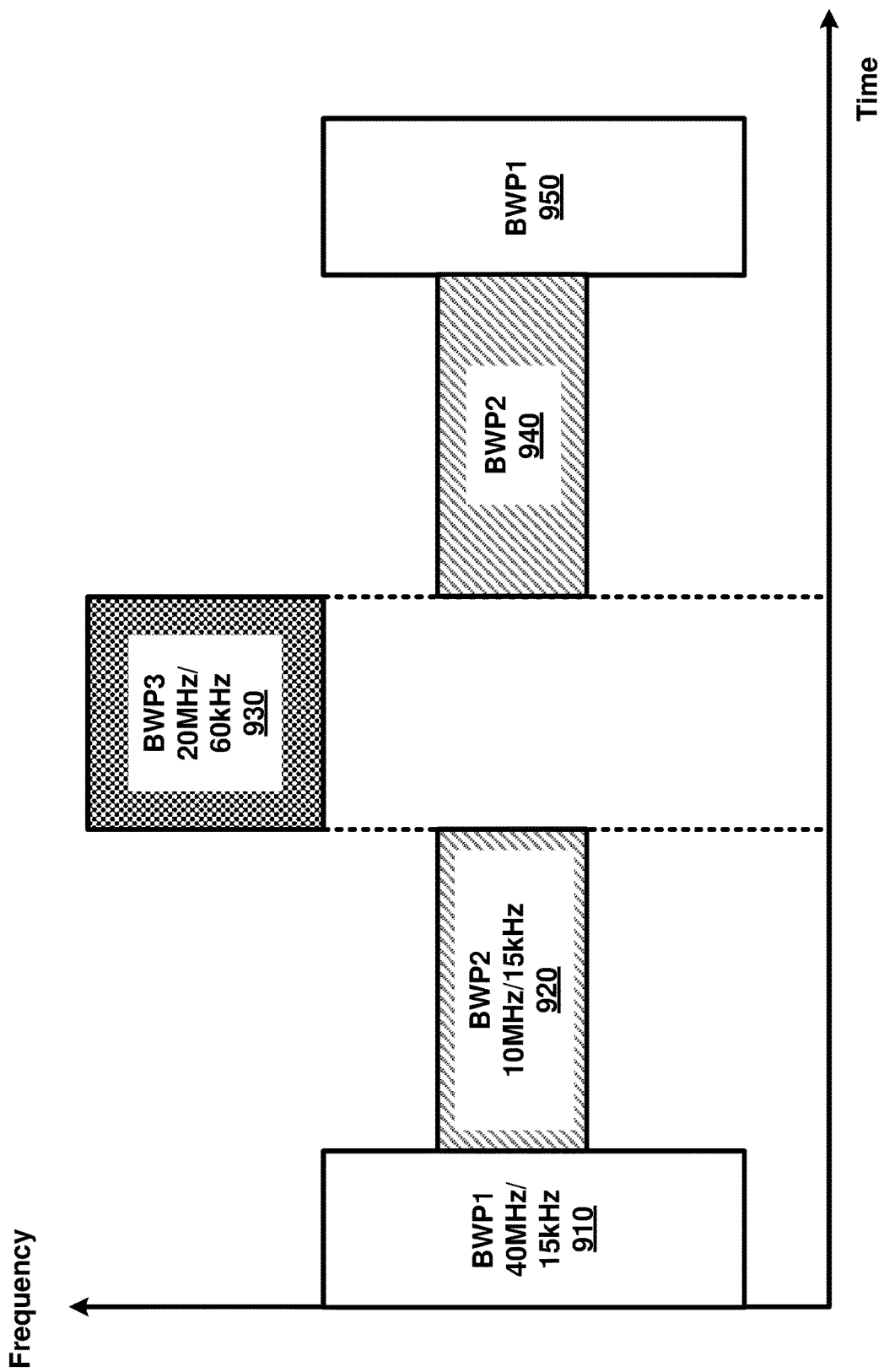
FIG. 9 is an example diagram of configured BWPs as per an aspect of an embodiment of the present disclosure.

FIG. 9 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 9 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 10A:
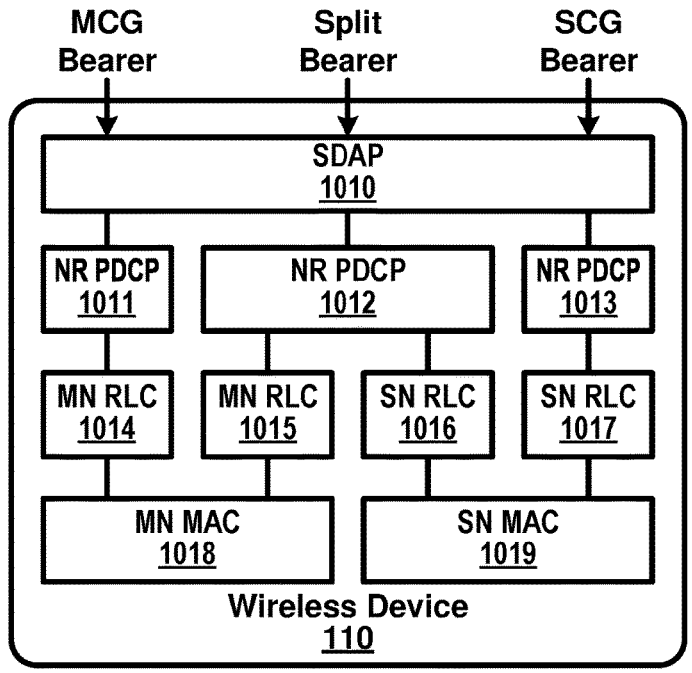
FIG. 10A, and FIG. 10B are diagrams of an example multi connectivity as per an aspect of an embodiment of the present disclosure.
Figure 10B:
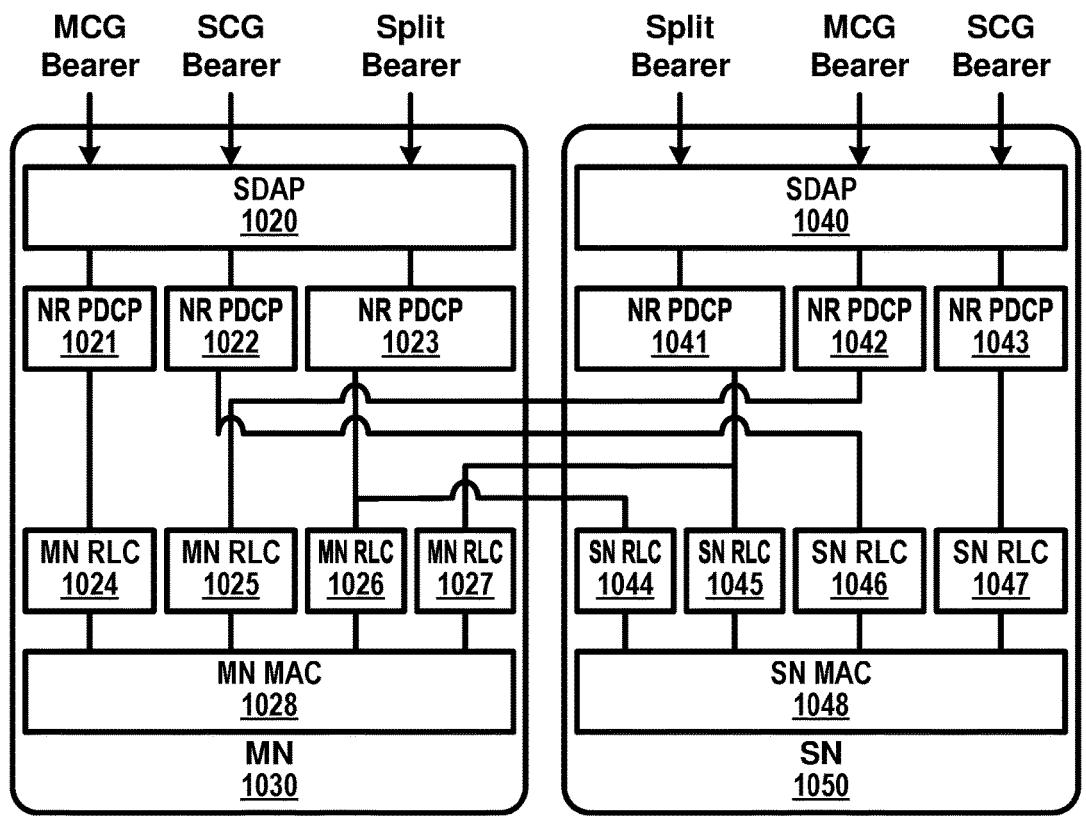

FIG. 10A and FIG. 10B show packet flows employing a multi connectivity (e.g. dual connectivity, multi connectivity, tight interworking, and/or the like). FIG. 10A is an example diagram of a protocol structure of a wireless device 110 (e.g. UE) with CA and/or multi connectivity as per an aspect of an embodiment. FIG. 10B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not be supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 11:
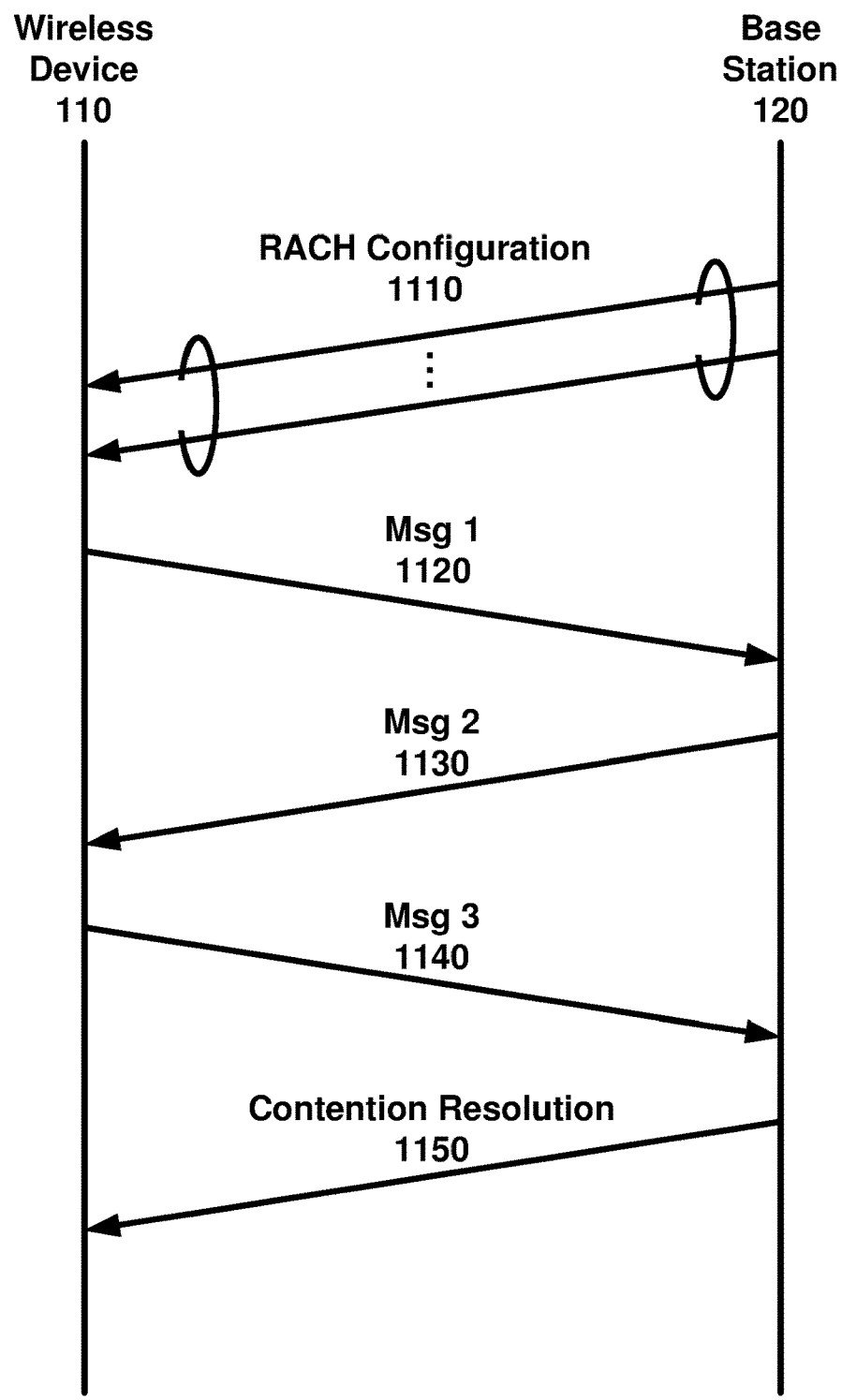
FIG. 11 is a diagram of an example random access procedure as per an aspect of an embodiment of the present disclosure.

FIG. 11 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-ResponseWindow or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 12:
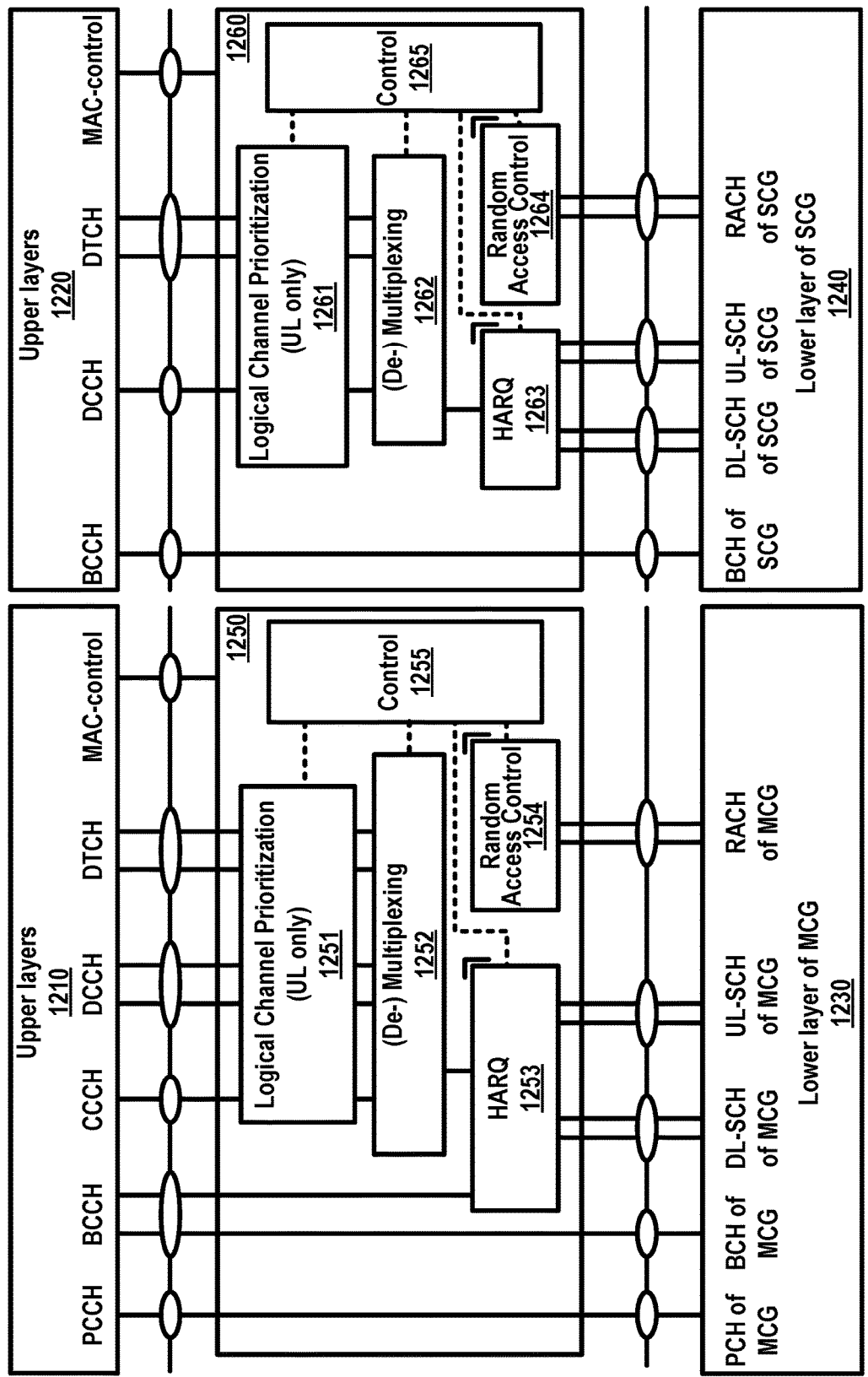
FIG. 12 is a structure of example MAC entities as per an aspect of an embodiment of the present disclosure.
Figure 13:
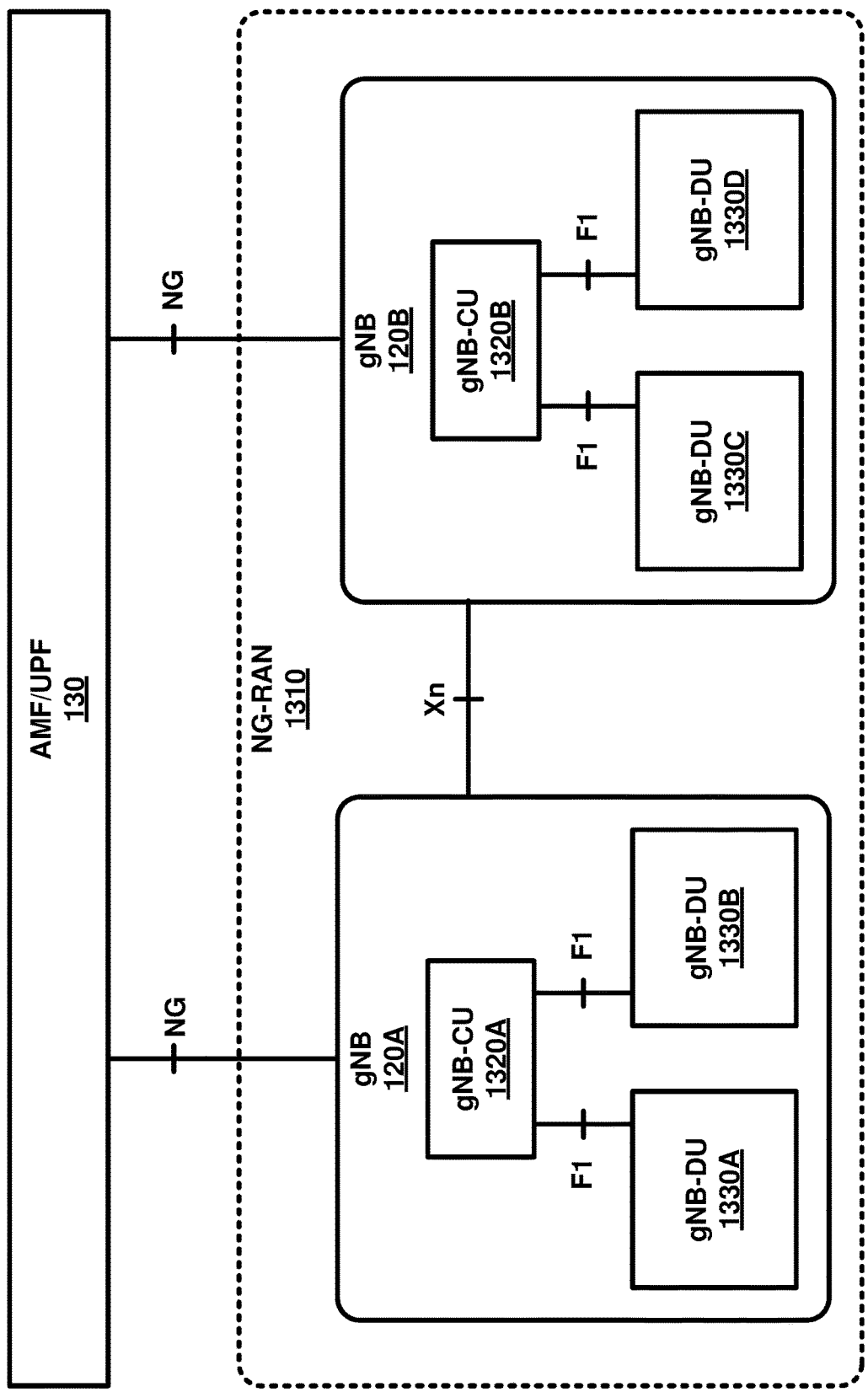
FIG. 13 is a diagram of an example RAN architecture as per an aspect of an embodiment of the present disclosure.

FIG. 12 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

FIG. 13 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 14:
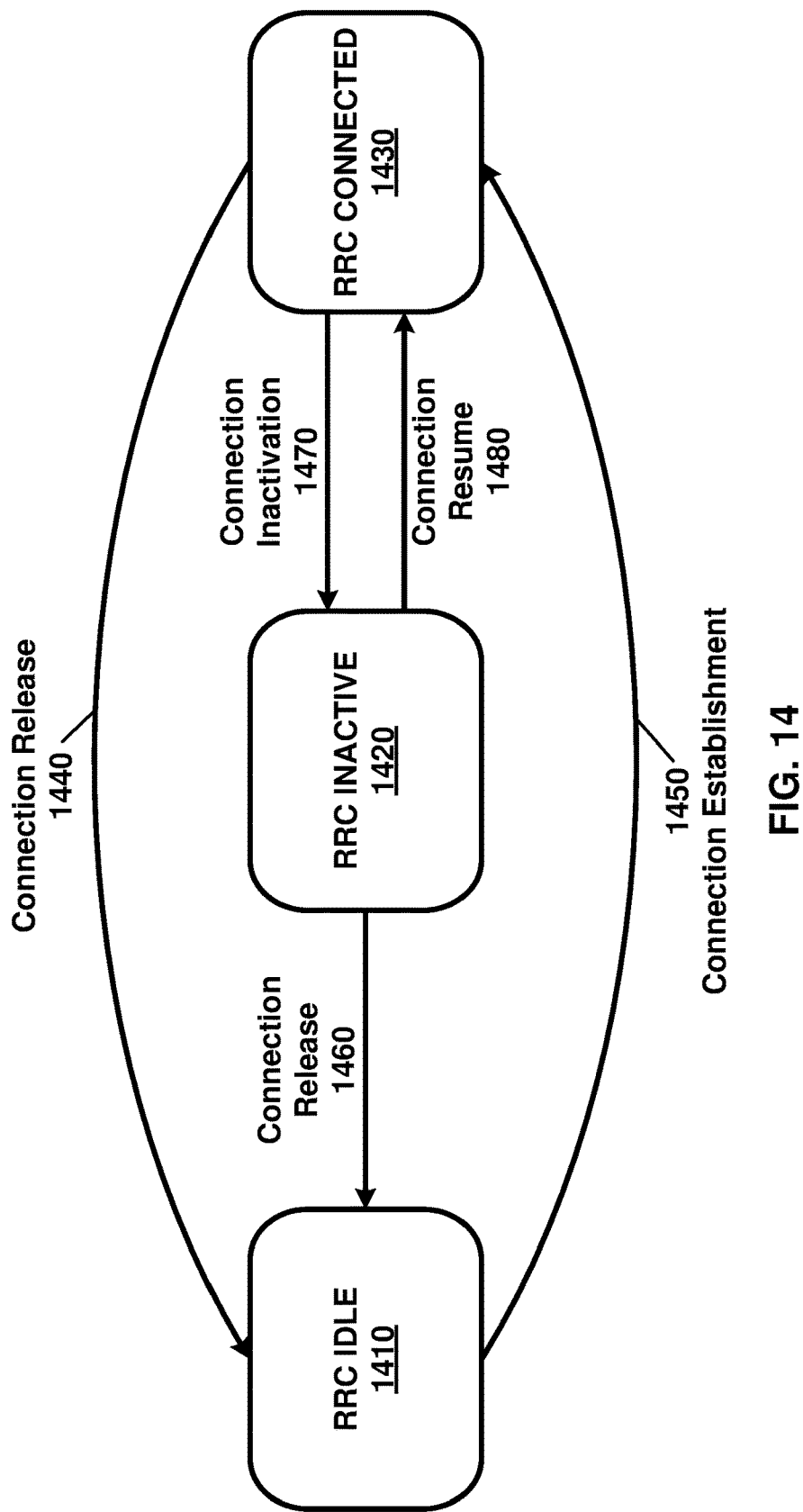
FIG. 14 is a diagram of example RRC states as per an aspect of an embodiment of the present disclosure.

FIG. 14 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC_Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In an example, a base station may control mapping of one or more logical channels (e.g., by the wireless device) to one or more transmission durations and/or numerologies and/or transmission time intervals (TTIs), e.g. TTI durations and/or cells. In an example, base station may configure (e.g., using RRC) a maximum transmission duration for each logical channel in a plurality of logical channels. In an example, the maximum transmission duration may correspond to a maximum PUSCH duration. In an example, the maximum transmission duration may correspond to a maximum duration of a transport block. In an example, a transmission duration may be smaller than or equal to a TTI duration corresponding to the transmission duration. In an example, configuration parameters for a logical channel may comprise an information element indicating the maximum transmission duration and/or maximum PUSCH duration and/or the maximum transport block duration. In an example, the mapping may be semi-static (e.g., with RRC configuration), dynamic (e.g., using physical layer and/or MAC layer signalling), pre-configured at the wireless device, hard split/soft split, etc. In an example, a wireless device may support a plurality of TTIs and/or numerologies from a single cell. In an example, a plurality of TTIs and/or numerologies and/or cells may be handled by a plurality of MAC entities. In an example, the plurality of TTIs and/or numerologies and/or cells may be grouped (e.g., based on band, types of service/QoS, etc.) and a group of TTIs/numerologies/cells may be handled by a MAC entity. In an example, the plurality of TTIs and/or numerologies and/or cells may be handled by a single MAC entity.

In an example, a radio bearer (RB) and/or logical channel (LC) may be configured by network/gNB to be mapped to one or more numerologies and/or TTI durations and/or transmission durations. In an example, a MAC entity may support one or more numerologies and/or TTI durations and/or transmission durations. In an example, a logical channel may be mapped to one or more numerologies and/or TTI durations and/or transmission durations. In an example, a HARQ entity may support one or more numerologies and/or TTI durations and/or transmission durations.

In an example, one or more numerologies and/or TTI durations and/or transmission durations may be supported by a plurality of serving cells and/or from one serving cell. The mapping of radio bearer/logical channel to numerology/TTI duration/transmission durations may be configured when the radio bearer/logical channel is configured/added/established. In an example, the mapping configuration may not be changed until release of the radio bearer. In an example, the mapping configuration may be reconfigured via RRC reconfiguration. In an example, gNB may provide high priority for URLLC traffic to meet the QoS (e.g., delay) requirements of URLLC.

In an example, one or more logical channels with similar QoS requirements (e.g., throughput, latency, etc.) may be mapped to a same MAC entity. In an example, the one or more logical channels mapped to the same MAC entity may be scheduled on a same numerology/TTI duration/transmission duration. In an example, physical layer resources may be shared among one or more MAC entities. In an example, there may be one or more interfaces among the one or more MAC entities. In an example, there may be a centralized control layer above the MAC layer. In an example, physical layer resources may be semi-statically configured (e.g., using RRC) among the one or more MAC entities. In an example, RRC signaling and/or centralized control layer above the MAC layer may indicate the configuration/reconfiguration. In an example, one or more logical channels with similar QoS requirements may be mapped to a same HARQ entity. In an example, the one or more logical channels may be scheduled with a same numerology/TTI length/transmission duration.

In an example, data from one or more logical channels may be multiplexed in a transport channel by applying a logical channel prioritization (LCP) procedure. In an example, when a new transmission is initiated, a MAC entity may multiplex data from a plurality of logical channels in same granted resources. The LCP procedure may determine amount of data for a logical channel that may be multiplexed in the granted resources. In an example, LCP may enable the QoS of different radio bearers.

In an example, a logical channel may be configured with a PBR (prioritized bit rate), e.g., with RRC singling. In an example, the PBR may guarantee a minimum data rate for a logical channel. In an example, a logical channel may be served with an amount of data limited by the PBR*TTI. In an example, after the logical channels are served by corresponding PBR and if there is any resource space left in the grant, no limitation of the resources may be applied until either the grant resources are exhausted or there is no data in the logical channels.

In an example in NR, a plurality of numerologies/TTIs/transmission durations may be supported on one carrier and/or on a plurality of carriers. In an example, the services may require a plurality of QoS levels. For example, the URLLC may require ultra-low latency while eMBB may require high throughput. In an example, a UE may support a plurality of services simultaneously.

In an example, mapping between a logical channel to one or more numerologies/TTI durations/transmission durations may be fixed. In an example, the mapping between a logical channel to one or more numerologies/TTI durations/transmission durations may be dynamic (e.g., using physical layer or MAC layer signaling). In an example, the mapping between a logical channel to one or more numerologies/TTI durations/transmission durations may be semi-static (e.g., using RRC).

In an example in NR, a logical channel may have one or more associated numerologies/TTI durations/transmission durations. In an example, a logical channel may be associated with a maximum and/or a minimum TTI duration/transmission duration. For example, a logical channel with URLLC packets may be mapped to numerologies with small TTI durations/transmission durations (e.g., smaller than a threshold) to guarantee the maximum delay requirements. In an example, a logical channel with eMBB packets may be mapped to one or more numerologies with large TTI duration/transmission duration (e.g., larger than a threshold) to improve the throughput. In an example, mapping between a logical channel and one or more TTI durations/transmission durations/numerologies may be configured by the high layer signaling, e.g., RRC signaling. In an example, the mapping between a logical channel and one or more TTI durations/transmission durations/numerologies may be signaled with DCI and/or MAC control element.

In an example, the packets in logical channels mapped to one or more first TTIs/transmission durations/numerologies may be multiplexed into the granted resources for other different TTIs/transmission durations/numerologies in some scenarios. For example, if resources of a grant resources with TTI/transmission duration/numerology to which a logical channel for URLLC is mapped is not completely allocated, eMBB packets in a logical channel mapped to large TTI/transmission duration/numerology may use the left space in some scenarios. In an example, NR may support semi-static mapping between logical channels and TTIs/transmission durations/numerologies.

In an example, a TTI/transmission duration/numerology may be indicated in a grant for a UE. A DCI format may comprise one or more fields to indicate to a UE a TTI/transmission duration/numerology for the grant. In an example, a maximum and/or minimum TTI duration/transmission duration the numerology may support may be included in a grant. In an example, at least the TTI/transmission duration for a numerology may be visible to the MAC layer. In an example, the TTI duration/transmission duration for a numerology may be visible to the MAC layer to perform logical channel and numerology mapping. In an example, one or more TTI durations/transmission durations may be included in one or more of the DCI formats.

In an example, a logical channel may be mapped to one or more TTIs/transmission durations/numerologies through high layer signaling. Logical channel prioritization (LCP) may be applied to one or more logical channels which may be mapped to the TTI/transmission duration/numerology indicated by a given grant. LCP may be applied to other logical channels when the given grant has left space.

In an example, for one or more numerologies, at least the TTI duration/transmission duraiton of the one or more numerologies may be visible to MAC. In an example, URLLC services may require a short TTI duration/transmission duration to achieve low latency. In an example, eMBB services may use a large TTI/transmission duration and/or slot aggregation to achieve high throughput. In an example, mMTC services may require narrow bandwidth capacity for intermittent small data.

In an example, NR may provide support for carrier aggregation. In an example, carriers with the same or different numerologies may be supported. In an example, a plurality of TTIs/transmission durations/numerologies may be time domain multiplexed (e.g., TDM) and/or frequency domain multiplexed (e.g., FDM) in a carrier. In an example, slot aggregation may be supported. Data transmission may be scheduled to span one or more slots. In an example, slot aggregation may be used for eMBB services with large volume of data. In an example, min-slots may be used for delay-critical URLLC services by occupying small number of symbols In an example, a radio bearer may be configured by network to be mapped to one or more numerologies/TTI durations/transmission durations. In an example, a logical channel may be mapped to one or more numerologies/TTI durations/transmission durations. In an example, ARQ transmission/retransmission may occur across different numerologies/TTI durations/transmission durations. In an example, a MAC scheduler may determine that ARQ transmission/retransmission may be transmitted over which numerology/TTI duration/transmission durations. In an example, the RLC layer may be transparent to the PHY numerologies/TTI durations/transmission durations. In an example, the RLC configuration may be per logical channel. There may be one RLC configuration for a logical channel. In an example, RRC may reconfigure mapping between a radio bearer/logical channel and one or more numerologies/TTI durations/transmission durations.

In an example, NR may support ARQ transmissions/retransmissions across a plurality of numerologies/TTI durations/transmission durations if a corresponding radio bearer is configured to a plurality of numerologies/TTI durations/transmission durations. In an example, RRC may reconfigure mapping between a radio bearer/logical channel and one or more numerologies/TTI durations/transmission durations.

In an example, a single HARQ entity may support one or more numerologies/TTIs/transmission durations. In an example, HARQ transmissions transmitted over one TTI/transmission duration/numerology may be switched to a different TTI/transmission duration/numerology in some scenarios. For example, when the UE undergoes sudden channel variations due to high speed, the gNB may use another TTI/transmission duration/numerology which may counteract the frequency offset. The HARQ entity may maintain one or more process IDs towards one or more numerologies/TTIs/transmission durations. In an example, HARQ configuration may not be numerology/TTI duration/transmission duration specific. In an example, within a single carrier, a single HARQ entity may support one or more numerologies/TTI durations/transmission durations. HARQ transmission and retransmissions may occur on different numerologies/TTIs/transmission durations.

In an example for carrier aggregation, a HARQ entity may support one or more numerologies across the carriers. In an example, cell index and/or process ID where transmission/retransmissions occur may be indicated. In an example, a TTI/transmission duration/numerology may be used by one or more logical channels corresponding to a service. In an example, a TTI/transmission duration/numerology may be used by a plurality logical channels corresponding to a plurality of services. In an example, a TTI/transmission duration/numerology may be shared by one or more logical channels corresponding to one or more services. In an example, TTI/transmission duration/numerology sharing may be allowed while meeting requirements for different services. For example, one or more logical channels corresponding to an eMBB service with delay tolerability may use a TTI/transmission duration/numerology for URLLC if performance of URLLC service is not harmed.

In an example in LTE, data from a plurality of logical channels may be multiplexed into a MAC PDU. In an example in LTE, the MAC PDU may be transmitted on a numerology with TTI duration/transmission duration of 1 ms. In an example, LCP (Logical Channel Prioritization) procedure may be used for the MAC PDU construction. In an example, LCP may determine the amount of data from a logical channel to be multiplexed in a MAC PDU. By using the LCP procedure, the UE may satisfy the QoS of a radio bearer. In an example, a PBR (Prioritized Bit Rate) may be configured for a logical channel. The PBR may enable a minimum data rate guaranteed for the logical channel.

In an example in LTE, LCP may be implemented by allocating resources of a grant to one or more logical channels in a decreasing priority order. In an example, the amount of allocated resources to a logical channel may be limited by a corresponding PBR of the logical channel. In an example, a logical channel may be served up to the corresponding PBR value. In an example, if there is any space left, a logical channel may be allocated resource in decreasing priority order, without limitation on the allocated resource. In an example in LTE, a logical channel may use radio resource allocated by the network to the UE. In an example, a logical channel may not use resources allocated from unlicensed bands.

Figure 15:
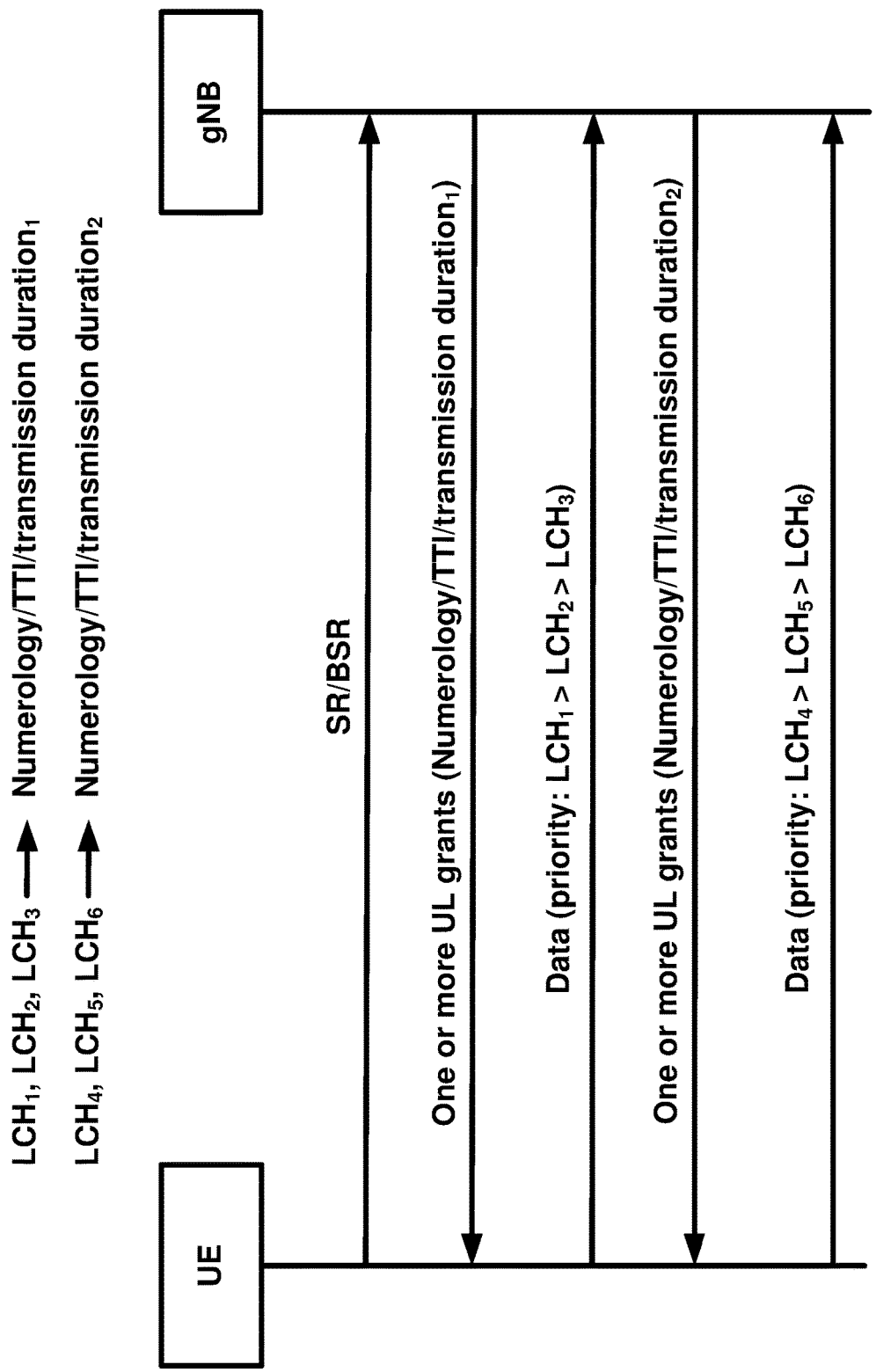
FIG. 15 is a diagram of an example data scheduling as per an aspect of an embodiment of the present disclosure.

In an example, a sub-band within a carrier may be configured with a numerology. In an example, a transport block (TB) may be allocated within a sub-band. In an example, a TB may be transmitted on a (e.g., only one) numerology/TTI. In an example in NR, for delay sensitive services, like URLLC, numerology with reduced TTI may be adopted to transmit and retransmit the URLLC data. In an example, more control signaling may be needed for numerologies with shorter TTIs than numerologies with longer TTIs. In an example for the delay tolerable service, like eMBB, a numerology with long TTI may be adopted. In an example, the network or the gNB may provide differentiated QoS to different logical channels via mapping between the logical channels and the numerologies/TTIs and/or assigning priorities to the logical channels. In an example in FIG. 15, a possible mapping between logical channels and the numerologies/TTIs is illustrated. For example, logical channel 1 (LCH1), LCH2 and LCH3 may be mapped to numerology/TTI/transmission duration 1 in a decreasing priority order, and the LCH4, LCH5 and LCH6 may be mapped to numerology/TTI/transmission duration 2 in a decreasing priority order.

In an example, a logical channel may be associated with a primary TTI/transmission duration/numerology and one or more secondary TTIs/transmission durations/numerologies. In an example, to provide flexibility and efficiency in utilization of radio resources, a service with a large amount of data may be allowed to transmit on secondary TTIs/transmission durations/numerologies if resource of the primary TTI/transmission duration/numerology is exhausted and there is space left on the secondary TTIs/transmission durations/numerologies.

In an example, a radio bearer may be configured by the network to be mapped to one or more numerologies/TTI durations/transmission durations. A logical channel may be mapped to one or more numerologies/TTI durations/transmission durations. In an example, a logical channel may be associated with one or more numerologies/TTIs/transmission durations. In an example, a logical channel may be configured with numerology/TTI/transmission durations specific priority. A logical channel priority may be different on different numerologies/TTIs/transmission durations. In an example, a logical channel may use resource from one or more TTIs/numerologies/transmission durations. In an example, a priority of a logical channel may be different on different TTIs/numerologies/transmission durations. In an example, an eMBB service may be de-prioritized on a numerology with short TTI/transmission duration compared with a URLLC service. In an example, a UE may prioritize the eMBB service rather than the URLLC service on the numerology with long TTI/transmission duration.

In an example, FIG. 16 illustrates two examples of numerology/TTI/transmission duration specific logical channel priority handling. A logical channel may be configured to be associated with both numerology/TTI/transmission duration 1 and numerology/TTI/transmission duration 2. In example 1, for a TTI/transmission duration/numerology, the UE may allocate resource to a logical channel to satisfy the PBR in a decreasing priority order. In an example, the UE may allocate the remaining resource for the remaining data associated with a logical channel in order of priority. In example 2, logical channels LCH4-LCH6 may be served on numerology/TTI/transmission duration 1 if the data of the logical channels LCH1-LCH3 have been exhausted. The same procedure may apply to numerology/TTI/transmission duration 2, where logical channels LCH1-LCH3 may be de-prioritized and may be prohibited to use the radio resource if the logical channels LCH4-LCH6 still have data to transmit.

In an example, numerology specific rules may be defined for logical channel prioritization, e.g., in terms of allocating resources to logical channel associated with multiple numerologies. In an example, when a logical channel is mapped to a plurality of numerologies/TTIs/transmission durations, the UE may construct a plurality of MAC PDUs for TBs from a plurality of numerologies/TTIs at substantially the same time. In an example, if the UE performs LCP sequentially on the plurality of numerologies/TTIs/transmission durations, the amount of data put into the plurality of MAC PDUs may be different, as how much data UE transmits via a TTI/transmission duration/numerology may depend on how much data UE has for the resources left after PBR is satisfied. In an example, the processing order of UL grants from different TTIs/transmission durations/numerologies may be determined either by network configuration, and/or by pre-defined criteria. In an example, with TTI/transmission duration/numerology prioritization, the network/gNB may correctly calculate the amount of data expected from a logical channel and may allocate UL grant properly. In an example, when a logical channel is associated with multiple numerologies/TTIs/transmission durations, the processing order of UL grants of different numerologies may be determined either by network configuration, or by pre-defined criterion.

In an example, Logical Channel Prioritization procedure may be applied when a new transmission is performed. In an example, RRC may signal for a logical channel: priority where an increasing priority value may indicate a lower priority level, prioritisedBitRate which may set Prioritized Bit Rate (PBR), bucketSizeDuration which may set Bucket Size Duration (BSD).

In an example, a MAC entity may maintain a variable Bj for a logical channel j. Bj may be initialized to zero when logical channel j is configured/established. In an example, Bj may be incremented by the product PBR×TTI duration for a TTI, where PBR is Prioritized Bit Rate of logical channel j. In an example, the value of Bj may not exceed the bucket size. If the value of Bj is larger than the bucket size of logical channel j, it may be set to the bucket size. The bucket size of a logical channel may be equal to PBR×BSD, where PBR and BSD may be configured by upper layers.

In an example, logical channels with Bj>0 may be allocated resources in a decreasing priority order. If the PBR of a logical channel is set to "infinity", the MAC entity may allocate resources for all the data that is available for transmission on the logical channel before meeting the PBR of the lower priority logical channel(s). In an example, MAC entity may decrement Bj by the total size of MAC SDUs served to logical channel j. The value of Bj may be negative. In an example, if resources remain, the logical channels may be served in a decreasing priority order (e.g., regardless of the value of Bj) until either the data for that logical channel or the UL grant is exhausted, whichever comes first. Logical channels configured with equal priority may be served equally.

In an example, a radio bearer may be configured by network/gNB to be mapped to one or more numerologies/TTIs/transmission durations. In an example, a serving cell may comprise one or more numerologies. In an example, a UE may have UL grants on one or more numerologies/TTIs/transmission durations. In an example, a UE may determine how to allocate resources of an UL grant among one or more radio bearers (RBs) which may be mapped to a TTI/numerology/transmission duration indicated in the UL grant using LCP procedure.

In an example, a first priority may be configured for a logical and the first priority may be independent of the one or more numerologies/TTIs/transmission durations. In an example, one or more priorities may be configured for a logical channel. In an example, a priority may be configured for each of a plurality of numerologies/TTIs/transmission durations that the logical channel may be mapped to. In an example, a priority may be configured for each of a plurality of numerologies/TTIs/transmission durations that are configured for a wireless device.

In an example, a radio bearer/logical channel may be configured with absolute priority. In an example, a RB/LC priority may be numerology/TTI/transmission duration specific for the numerologies/TTI/transmission durations that the RB/LC may be mapped. In an example, a first priority may be configured for a RB/LC. The first priority may have a same value for one or more numerologies/TTIs/transmission durations. In an example, for a RB/LC mapped to a plurality of numerologies/TTIs/transmission durations, the first priority may be considered to decide the UL grant processing order in LCP procedure.

In an example, a plurality of carriers with one or more numerologies may be aggregated in NR. In an example, at least TTI length/transmission duration of one or more numerologies may be visible to MAC layer. In an example, a numerology may be characterized by at least by subcarrier spacing (SCS), CP length and TTI length/transmission duration. In an example, TTI length/transmission duration may be defined by a length of subframe, slot and/or mini-slot. In an example, one or more numerologies may have a same TTI length/transmission duration. In an example, one or more numerologies may not have a same TTI length/transmission duration. In an example, TTI length/transmission duration may not differentiate different numerologies. In an example, one or more numerology characteristics such as SCS and CP length may not be visible to MAC layer.

In an example, gNB may configure an index for a TTI/numerology/transmission duration. In an example, an index may be pre-configured for a TTI/numerology/transmission duration. In an example, the numerology/TTI/transmission duration index may be indicated by PHY layer to MAC when a UL grant is received.

In an example, a service may only utilize one or more numerologies/TTIs/transmission durations. For example, a LC/DRB for URLLC may be only associated to a numerology/TTI/transmission duration to satisfy QoS with high latency and reliability requirements. In an example, a service (e.g., eMBB) may be transmitted with a plurality of numerologies/TTIs/transmission durations. In an example, an LC/DRB for eMBB may be associated to a plurality of numerologies/TTIs/transmission durations. In an example, a numerlogy/TTI/transmission duration may only be used for a service (e.g., URLLC). In an example, a numerology/TTI/transmission duration may be used for a plurality of services. A plurality of LCs/DRBs may be associated to a same numerology. In an example, when one or more numerologies/TTIs/transmission durations are configured for a DRB/LC, the PDUs of the LC may only be transmitted on the one or more associated numerologies/TTIs/transmission durations.

In an example, number of MAC entities may be equal to number of schedulers. In an example in NR with a plurality of numerologies/TTIs/transmission durations, a UE may support a plurality of numerologies/TTIs/transmission durations from a cell. In an example, resource allocation on the different numerologies/TTIs/transmission durations from a cell may be scheduled by a same scheduler. In an example, a plurality of MAC entities may handle a plurality of numerologies/TTIs/transmission durations. In an example, the plurality of MAC entities may coordinate for the MAC functions, e.g. DRX, TAT, etc.

In an example, a default configuration may configure a LCH to use the TTI lengths/transmission durations of a numerology unless some restriction is configured. In an example, a maximum TTI length/transmission duration may be configured for a LCH to restrict which TTI lengths/transmission durations may be used to transmit data of the LCH. In an example in LTE, a PDCCH may be used to allocate an UL grant to a MAC entity. When an UL grant is received, the MAC entity may apply LCP for RBs mapped to the MAC entity. The LCP procedure may be used by the MAC entity to construct a MAC PDU using data from one or more RBs.

In an example, due to the LCP procedure, one MAC PDU may contain data from one or more RBs regardless of whether those RBs have same QoS or not. In an example, if data from one or more RBs with different QoS are multiplexed into one MAC PDU, they may experience same radio treatment, e.g. same HARQ operation point, same MCS level, etc. In an example, different QoS handling may not be supported after data is included in a MAC PDU. In an example, to ensure different QoS handling in radio interface, QoS multiplexing in one PDU may be avoided. In an example, QoS multiplexing in a PDU may be avoided. In an example, a MAC PDU may be constructed using only data from RBs with same QoS. In an example, QoS multiplexing may not be supported in MAC. In an example, for an UL grant, the UE may apply LCP procedure for RBs having same QoS.

In an example, gNB may indicate the UE to transmit data from a QoS. In an example, the gNB may provide QoS indication in an UL grant for the UE to use the UL grant only for data from the indicated QoS. In an example, for the gNB to know the UE's buffer status of each QoS, the BSR may indicate buffer status per QoS. In an example, QoS specific UL grant and QoS specific BSR may be used.

In an example, logical channel prioritization and multiplexing may determine which logical channel(s) may be served in a MAC PDU. In an example one or more logical channels may be better served on one or more numerologies/TTI durations/transmission durations than others. In an example, to meet tight latency requirements of URLLC, the corresponding logical channels may be served on a short numerology/TTI duration/transmission duration. In an example, LCP may take the numerology/TTI duration/transmission duration of a MAC PDU into account. In an example, a maximum TTI duration/transmission duration parameter may be configured for a logical channel. In an example, the maximum TTI duration/transmission duration parameter may be used to select which channels to serve. In an example, LCP may be applied to the selected logical channels. In an example, for selection of logical channels to serve for a UL transmission with a TTI duration/transmission duration, a MAC entity may select one or more logical channels with a maximum TTI duration/transmission duration. The MAC entity may apply LCP on the one or more selected logical channels.

In an example, the LCP may be aware of numerology/TTI duration/transmission duration of a MAC PDU. In an example, the TTI durataion/transmission duration/numerology information may be carried in an uplink grant. In an example, the indication may be explicit (e.g., using a field in the scheduling DCI and/or other DCI). In an example, the indication may be implicit (e.g. the TTI duration/transmission duration of the UL transmission may be same as the DL transmission of the UL grant). In an example, the UL grant may carry the TB size. In an example, a logical channel may be configured by RRC with a maximum TTI duration. In an example, for LCP, UL grant may carry (explicitly and/or implicitly) information on the TTI duration/transmission duration of the UL transmission. In an example, for LCP, UL grant may carry information on the size of the MAC PDU.

In an example, a numerology/TTI duration/transmission duration may be used on a carrier (e.g., one numerology per carrier). In an example, a plurality of numerologies/TTI durations may be used on a carrier. In an example, a MAC entity may serve one or more carriers. In an example, carrier aggregation may support one HARQ entity per carrier. In an example, one HARQ entity may span a plurality of carriers. In an example, HARQ entity may not be restricted to a single numerology/TTI duration/transmission duration. In an example, HARQ retransmissions may be moved from one numerology/TTI duration/transmission duration to another one. In an example, a MAC entity may have one HARQ Entity per carrier. In an example, HARQ entity may not be restricted to a single numerology/TTI duration/transmission duration. In an example, discontinuous reception (DRX) function of MAC may not be restricted to a single numerology/TTI duration/transmission duration. In an example, a UE may have one MAC entity per cell group. In an example, a MAC entity may not be restricted to a single numerology/TTI duration/transmission duration.

In an example, logical channel to numerology/TTI length/transmission duration mapping may be configured/reconfigured via RRC. In an example, numerology/TTI duration/transmission duration may be related to the requirement/characteristics of data transmission, e.g., latency. In an example, a numerology/TTI duration/transmission duration may be configured when an RB is configured/established. In an example, a single logical channel may be mapped to one or more numerologies/TTI durations/transmission durations.

In an example, a range of numerologies/TTI durations may be configured for a RB' logical channel. For example, minimum numerology/TTI duration/transmission duration and/or maximum numerology/TTI duration/transmission duration may be signalled for the RB/logical channel. In an example, to configure a plurality of numerologies/TTI durations/transmission durations for the RB, a range of associated numerology/TTI duration/transmission duration may be signaled for the RB.

In an example, HARQ retransmission may be performed across one or more numerologies and/or TTI durations/transmission durations. In a synchronous HARQ procedure example, a maxHARQ-Tx and/or maxHARQ-Msg3Tx may be configured. In an example, an asynchornous HARQ procedure may be used in NR. In an example, LCP may take into account restriction of logical channel to numerology/TTI length/transmission duration mapping In an example, in token-bucket model, bucket for logical channel j (Bj) may be increased every TTI by PBR*TTI duration. In an example, when a MAC SDU of the logical channel is included in a MAC PDU, bucket may be decreased by the amount of scheduled MAC SDUs. In an example, with one or more numerologies/TTI durations/transmission durations for an RB/logical channel, a UE may increase or decreases the bucket of the logical channel based on a 1 ms TTI duration. In an example, with one or more numerologies/TTI durations/transmission durations for an RB (logical channel), a UE may increase or decreases the bucket of the logical channel based on a configured/default TTI/transmission duration. In an example, gNB may configure the TTI/transmission duration that a UE may use to increase/decrease bucket size.

In an example, the LCP mechanism may be based on a token bucket model. A token bucket (Bj) may be maintained for a logical channel j. In an example, every TTI, a token (PBR) may be added into the bucket until the bucket is full. When data is transmitted from a logical channel, the corresponding number of tokens may be removed from the bucket. In an example, PBR may be maintained on average rather than every TTI.

In an example, Bj may be maintained for logical channels. An example LCP procedure may be performed in two stages. In an example, in a first stage, logical channels with Bj>0 may be served and in a second stage, the rest of the logical channels with data available may be served in order of priority. In an example, LCP may maintains QoS on average rather than meeting PBR requirements every TTI.

In an example, a gNB may map one or more carriers/numerologies to serve traffic which is not QoS sensitive. In an example, LCP procedure may be disabled for one or more carrier/numerology. In an example, RRC may indicate enabling/disabling of the one or more numerology.

In an example, the impact of one or more numerologies may be visible in terms of different TTI lengths/transmission durations at which MAC layer provides MAC PDUs to the physical layer. In an example, gNB may indicate to a wireless device logical to numerology/TTI/transmission duration mapping. In an example, when the MAC layer is requested to provide MAC PDUs, MAC layer may execute logical channel prioritization (LCP) and multiplexing functions. In an example, LCP may be executed separately for each numerology/TTI duration/transmission duration. In an example, the traffic associated with logical channels allowed to be transmitted over given numerology/TTI duration/ transmission duration may be considered. In an example, LCP may be executed separately for a numerology/TTI duration/transmission duration supported by a UE.

In an example, URLLC traffic may not be sent using eMBB numerology/TTI duration/transmission duration due to latency and reliability requirements. In an example, a UE may not multiplex traffic from logical channels that may not be mapped to URLLC numerology/TTI duration/transmission duration even if there is room for the payload. In an example, an eMBB numerology/TTI duration/transmission duration may not support QoS required by URLLC service. In an example, RRC may configure UE to multiplex traffic from one or more logical channels to a given numerology based on QoS requirements. In an example, HARQ configuration may be numerology/TTI duration/transmission duration specific.

In an example, different priorities among logical channels may be applied to the resources within different numerologies and/or TTI durations/transmission durations. In an example, a gNB may dynamically indicate the priority among logical channels. In an example, a UE may have a default priority among logical channels. In an example, the gNB may indicate, in an UL grant and/or other DCI, the logical channel that has the highest priority for the UL grant. In an example, a UE may adjust the default priority according to the indication from the gNB. In an example, a UE may adapt logical channel priorities based on an indication of priority information from a gNB.

In an example, gNB may configure one or more of logical channels that may only be mapped to one or more first numerologies/TTI durations/transmission durations (e.g., not mapped to numerologies/TTI durations/transmission durations other than the one or more first numerologies/TTI durations/transmission durations). In an example, a gNB may configure one or more logical channels that may be mapped to any numerologies/TTI durations/transmission durations.

In an example, a logical channel may be mapped to one or more numerologies/TTI durations/transmission durations. In an example, ARQ may be performed on one or more numerologies/TTI durations/transmission durations that the LCH is mapped to. In an example, the RLC configuration may be per logical channel and may not depend on numerology/TTI duration/transmission duration. In an example, logical channel to numerology/TTI length/transmission duration mapping may be reconfigured via RRC reconfiguration. In an example, HARQ retransmission may be performed across different numerologies and/or TTI durations/transmission durations. In an example, HARQ configuration may be numerology/TTI duration/transmission duration specific. In an example, a MAC entity may support one or more numerologies/TTI durations/transmission duration. In an example, LCP may consider mapping of logical channel to one or more numerologies/TTI durations/transmission durations.

In an example, relative priorities between and amongst MAC CEs and the logical channels may be configurable by the gNB/network. In an example, a default priority list may be used as baseline. The network may signal a priority list. The UE may override the default priority list. In an example, the dynamic priority list may be cell-specific or UE-specific.

In an example, a UE MAC may first perform first two steps of LCP for all resources of a given numerology/TTI duration/transmission duration. In an example, a UE MAC may first perform the first two steps of LCP for all applicable numerology/TTI duration(s)/transmission duration(s). The UE may perform a third step of LCP for all remaining resources (if any) of each numerology/TTI duration/transmission duration. In an example, priority may be configured by RRC per LCH for a LCH. In an example, PBR may be configured for a LCH per applicable numerology/TTI duration/transmission duration by RRC. In an example, a UE MAC may support dynamic signalling that indicates absolute priority for a given LCH (or LCG) when multiplexing data for a grant. In an example, dynamic signalling may be performed using DCI. In an example, dynamic signalling may be performed using MAC control element.

In an example, retransmission of a transport block may consider the mapping of logical channel to one or more numerology/TTI duration/transmission duration. In an example, an uplink grant may be associated with a numerology/TTI duration/transmission duration. For new transmission, MAC PDU may be generated by including logical channels that are mapped to the numerology/TTI duration/transmission duration of the uplink grant. In an example for retransmission, an uplink grant may be associated with a numerology/TTI duration that is commonly mapped to logical channels included in the MAC PDU.

In an example, an uplink grant may be associated with a numerology/TTI duration/transmission duration. The UL grant may indicate one or more numerologies/TTI durations/transmission durations. For new transmission, MAC PDU may be generated by including logical channels that are mapped to the one or more numerologies/TTI durations/transmission duration of the uplink grant. For retransmission, an uplink grant may be associated with a numerology/TTI duration/transmission duration that is commonly mapped to logical channels included in the MAC PDU.

In an example, if the UE receives an uplink grant associated with a numerology/TTI duration/transmission duration that may not be mapped to one of logical channels included in the MAC PDU, the UE may not use the uplink grant, e.g., ignore the uplink grant. In an example, a numerology/TTI duration/transmission duration may be identified by an index. In an example, the index for a numerology/TTI duration/transmission duration may be configured by RRC and/or pre-configured and/or hard-coded.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one or messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra-reliable low-latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/transmission durations/numerologies. In an example, a logical channel may not be mapped to one or more of the plurality of TTI durations/transmission duraitons/numerologies. In an example, a logical channel corresponding to a URLLC bearer may be mapped to one or more first TTI durations/transmission durations and a logical corresponding to an eMBB application may be mapped to one or more second TTI durations/transmission durations, wherein the one or more first TTI durations/transmission durations may have shorter duration than the one or more second TTI durations/transmission durations. In an example, the plurality of TTI durations/transmission durations/numerologies may be preconfigured at the wireless device. In an example, the one or more messages may comprise the configuration parameters of the plurality of TTI durations/transmission duration/numerologies. In an example, a base station may transmit a grant/DCI to a wireless device, wherein the grant/DCI may comprise indication of a cell and/or a TTI duration/transmission duration/numerology that the wireless device may transmit data. In an example, a first field in the grant/DCI may indicate the cell and a second field in the grant/DCI may indicate the TTI duration/transmission duration/numerology. In an example, a field in the grant/DCI may indicate both the cell and the TTI duration/transmission duration/numerology.

In an example, the one or more messages may comprise a logical channel group identifier for one or more of the plurality of the logical channels. In an example, one or more of the plurality of logical channels may be assigned a logical channel group identifier n, $0 \leq n \leq N$ (e.g., N=3, or 5, or 7, or 11 or 15, etc.). In an example, the one or more of the plurality of logical channels with the logical channel group identifier may be mapped to a same one or more TTIs/transmission durations/numerologies. In an example, the one or more of the plurality of logical channels with the logical channel group identifier may only be mapped to a same one or more TTIs/transmission durations/numerologies. In an example, the one more of the plurality of logical channels may correspond to a same application and/or QoS requirements. In an example, one or more first logical channels may be assigned logical channel identifier(s) and logical channel group identifier(s) and one or more second logical channels may be assigned logical channel identifier (s). In an example, a logical channel group may comprise of one logical channel.

In an example, the one or more messages may comprise one or more first fields indicating mapping between the plurality of logical channels and the plurality of TTIs/transmission durations/numerologies and/or cells. In an example, the one or more first fields may comprise a first value indicating a logical channel is mapped to one or more first TTI duration/transmission duration shorter than or equal to the first value. In an example, the one or more first fields may comprise a second value indicating a logical channel is mapped to one or more second TTI durations/transmission durations longer than or equal to the second value. In an example, the one or more first fields may comprise and/or indicate one or more TTIs/transmission durations/numerologies and/or cells that a logical channel is mapped to. In an example, the mapping may be indicated using one or more bitmaps. In an example, a value of one in a bitmap associated with a logical channel may indicate that the logical channel is mapped to a corresponding TTI/transmission duration/numerology and/or cell. In an example, if a value of zero in the bitmap associated with a logical channel may indicate that the logical channel is not mapped to a corresponding TTI/transmission duration/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/transmission durations/numerologic and/or cells.

Figure 17:
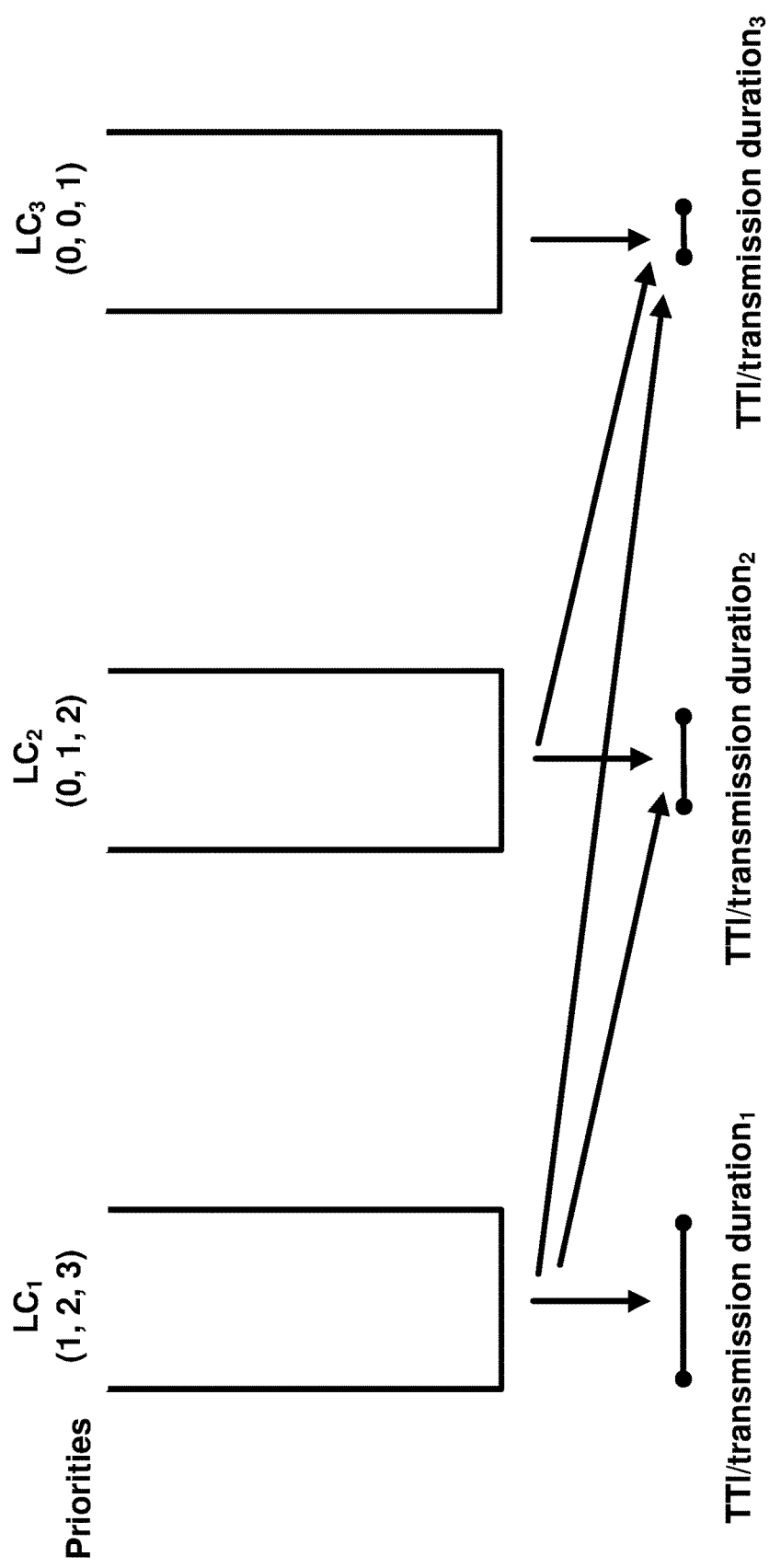
FIG. 17 is a diagram of an example mapping of logical channels to transmission durations as per an aspect of an embodiment of the present disclosure.

In an example, a first logical channel may be assigned at least a first logical channel priority. In an example, the first logical channel may be assigned one or more logical channel priorities for one or more TTIs/transmission durations/numerologies. In an example, the first logical channel may be assigned a logical channel priority for each of the plurality of TTIs/transmission durations/numerologies. In an example, a logical channel may be assigned a logical channel priority for each of one or more of the plurality of TTIs/transmission durations/numerologies. In an example, a logical channel may be assigned a logical channel priority for each of one or more TTIs/transmission durations/numerologies wherein the logical channel is mapped to the each of the one or more TTIs/transmission durations/numerologies. In an example, the one or more messages may comprise one or more second fields indicating priorities of a logical channel on one or more TTIs/transmission durations/numerologies. In an example, the one or more second fields may comprise one or more sequences indicating priorities of a logical channel on one or more TTIs/transmission durations/numerologies. In an example, the one or more second fields may comprise a plurality of sequences for the plurality of logical channels. A sequence corresponding to a logical channel may indicate the priorities of the logical channel on the plurality of TTIs/transmission durations/numerologies/cells or one or more of the plurality of TTIs/transmission durations/numerologies/cells. In an example, the priorities may indicate mapping between a logical channel and one or more TTIs/transmission durations/numerologies. In an example, a priority of a logical channel with a given value (e.g., zero or minus infinity or a negative value) for a TTI/transmission duration/numerology may indicate that the logical channel is not mapped to the TTI/transmission duration/numerology. In an example, FIG. 17 illustrates an example with three TTIs/transmission durations/numerologies and three logical channels (LC1, LC2, LC3) wherein LC1 is mapped to TTI1/transmission duration 1, TTI2/transmission duration 2, and TTI3/transmission duration 3 and LC2 is mapped to TTI2/transmission duration 2 and TTI3/transmission duration 3 and LC3 is mapped to TTI3/transmission duration 3. In an example, priorities of LC1 on TTI1/transmission duration 1, TTI2/transmission duration 2, and TTI3/transmission duration 3 may be indicated as (1, 2, 3), priorities of LC2 on TTI1/transmission duration 1, TTI2/transmission duration 2, and TTI3//transmission duration 3 may be indicated as (0, 1, 2), priorities of LC3 on TTI1//transmission duration 1, TTI2//transmission duration 2, and TTI3//transmission duration 3 may be indicated as (0, 0, 1). In an example, sizes of the sequence may be variable. In an example, a size of a sequence associated with a logical channel may be a number of TTIs/transmission durations/numerologies to which the logical channel is mapped. In an example, the sizes of the sequence may be fixed, e.g., the number of TTIs/transmission durations/numerologies/cells.

In an example, a TTI/transmission duration/numerology for a grant (e.g., as indicated by the grant/DCI) may not accept data from one or more logical channels. In an example, the one or more logical channels may not be mapped to the TTI/transmission duration/numerology indicated in the grant. In an example, a logical channel of the one or more logical channels may be configured to be mapped to one or more TTIs/transmission durations/numerologies and the TTI/transmission duration/numerology for the grant may not be among the one or more TTIs/transmission durations/numerologies. In an example, a logical channel of the one or more logical channels may be configured with a max-TTI/transmission duration parameter indicating that the logical channel may not be mapped to a TTI/transmission duration longer than max-TTI/transmission duration, and the grant may be for a TTI/transmission duration longer than max-TTI/transmission duration. In an example, a logical channel may be configured with a min-TTI/transmission duration parameter indicating that the logical channel may not be mapped to a TTI/transmission duration shorter than min-TTI/transmission duration, and the grant may be for a TTI/transmission duration shorter than min-TTI/transmission duration. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/TTIs/transmission durations, priorities of a logical channel on the one or more numerologies/TTIs/transmission duration, the numerology/TTI/transmission duration indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI/transmission duration indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

Example A

In the legacy scheduling procedures, uplink grants are for subframes/TTIs having the same duration. Different carriers use the same system frame number (SFN) and subframe numbers, and uplink subframes are substantially synchronized. Uplink transmissions may employ different NTA (timing offset between uplink and downlink) depending on TAG configuration. In NR, a plurality of grants may be received in different times for different overlapping and non-overlapping TTIs. The grants may be received on TTIs having different durations and the control channel monitoring occasions on different cells that the grants are received may be different. In addition, the timing between grants and uplink transmission is flexible and may be indicated in the uplink grant. Processing grants interpedently may increase UE processing requirements. The legacy procedures for selecting grants for processing the selected grants together are inefficient for NR and lead to performance degradation in terms of throughput and delay. Example embodiment enhances UE behavior for uplink multiplexing when UE receives a plurality of uplink grants. One or more selected grants in the plurality of grants are processed together. Example embodiments provides processes and systems for selecting/determining a subset of uplink grants for processing together, data multiplexing and uplink transmission.

Figure 18:
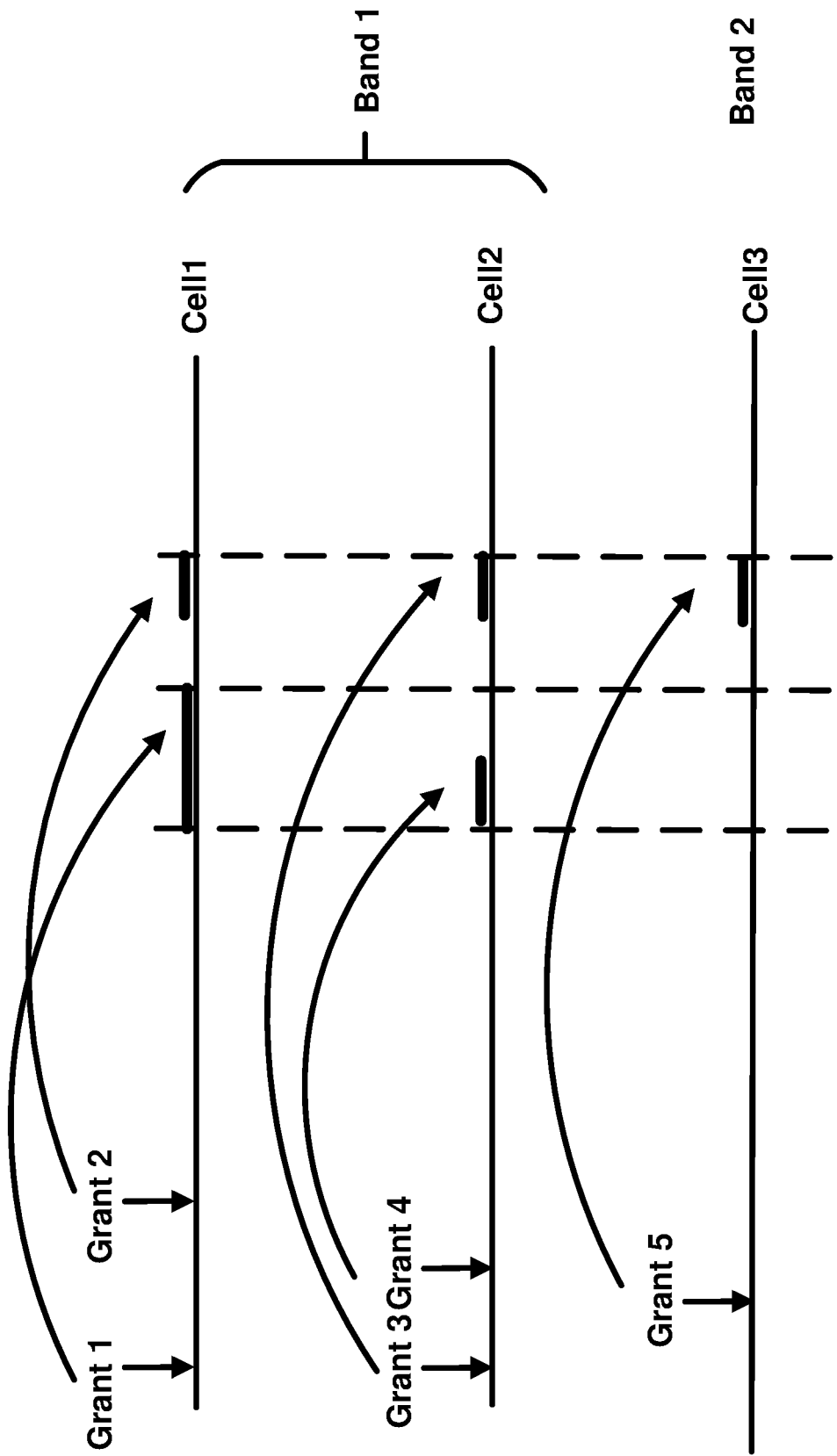
FIG. 18 is a diagram of an example reception of grants as per an aspect of an embodiment of the present disclosure.

In an example embodiment, a wireless device may receive a plurality of grants/DCIs from one or more base stations (e.g., eLTE eNB and/or NR gNB, etc.). An example is shown in FIG. 18 where a wireless device receives five grants for different TTIs/numerologies on three cells. A grant/DCI may indicate the resources and transmission parameters for the wireless device (e.g., modulation and coding scheme, timing e.g. time/slot/subframe, resource blocks, power control parameters, HARQ parameters, etc.). In an example, the grant/DCI may indicate cell and/or numerology and/or TTI/transmission duration to be used for transmission. Other transmission parameters may be indicated by a grant. A grant may be for a subframe/slot/mini-slot (TTI/numerology) with a first duration starting from the first duration starting time and ending at the first duration ending time. In an example, the wireless device may process (e.g., allocate resources from) a first plurality of grants of the plurality of grants together (e.g., jointly and/or substantially at a same time). In an example, a grant of the first plurality of grants processed together may have a grant size of e.g., N bytes for a first TTI/transmission duration/numerology. One or more logical channels may be mapped to the first TTI/transmission duration/numerology. A logical channel prioritization procedure in multiplexing and assembly entity of the wireless device may allocate the N bytes capacity of the grant to the one or more logical channels considering a plurality of parameters, such as buffer sizes of the one or more logical channels, priorities of the one or more logical channels on the first TTI/transmission duration/numerology, PBR, etc. to create a MAC PDU for transmission on the indicated cell/numerology/TTI/transmission duration in the grant. The physical layer may create a transport block using the MAC PDU and may calculate a transmission power using at least power control command in the grant and map the transport block to the resources indicated by the grant. The wireless device may transmit the transport block. In an example, the wireless device may select/determine the first plurality of grants from the plurality of grants based on one or more criteria. In an example, the wireless device may group a second plurality of the first plurality of grants/DCIs into a first grouped grant. Example B embodiments describe criteria for determining/selecting the second plurality of grants for grouping. The wireless device may perform logical channel prioritization procedure to multiplex data from one or more logical channels for a grant or grouped grant. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example embodiment, the one or more criteria for selecting the first plurality of grants may be that the first plurality of grants provide resources starting at substantially a same time. In an example, the grants may be for cells belonging to different timing advance groups using different NTA values. In an example, if the first plurality of grants provide resources starting at a same SFN and subframe number, the resources of the first plurality of grants start substantially at a same time. For the example in FIG. 18, Grant 1 and Grant 4 or Grant 2, Grant 3 and Grant 5 may be processed together/jointly.

In an example embodiment, a wireless device may receive a plurality of grants/DCIs from one or more base stations (e.g., eLTE eNB and/or NR gNB, etc.). An example is shown in FIG. 18 where a wireless device receives five grants for different TTIs/transmission durations/numerologies on three cells. A grant/DCI may indicate the resources and transmission parameters for the wireless device (e.g., modulation and coding scheme, timing e.g. time/slot/subframe, resource blocks, power control parameters, HARQ parameters, etc.). In an example, the grant/DCI may indicate cell and/or numerology and/or TTI/transmission duration to be used for transmission. Other transmission parameters may be indicated by a grant. A grant may be for a subframe/slot/mini-slot (TTI/numerology) with a first duration starting from the first duration starting time and ending at the first duration ending time. In an example, the wireless device may process (e.g., allocate resources from) a first plurality of grants of the plurality of grants together (e.g., jointly and/or substantially at a same time). In an example, a grant of the first plurality of grants processed together may have a grant size of e.g., N bytes for a first TTI/transmission durationnumerology. One or more logical channels may be mapped to the first TTI/transmission durtation/numerology. A logical channel prioritization procedure in multiplexing and assembly entity of the wireless device may allocate the N bytes capacity of the grant to the one or more logical channels considering a plurality of parameters, such as buffer sizes of the one or more logical channels, priorities of the one or more logical channels on the first TTI/transmission duration/numerology, PBR, etc. to create a MAC PDU for transmission on the indicated cell/numerology/TTI/transmission duration in the grant. The physical layer may create a transport block using the MAC PDU and may calculate a transmission power using at least power control command in the grant and map the transport block to the resources indicated by the grant. The wireless device may transmit the transport block. In an example, the wireless device may select/determine the first plurality of grants from the plurality of grants based on one or more criteria. In an example, the wireless device may group a second plurality of the first plurality of grants into a first grouped grant. Example B embodiments describe criteria for determining/selecting the second plurality of grants for grouping. The wireless device may perform logical channel prioritization procedure to multiplex data from one or more logical channels for a grant or grouped grant. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example embodiment, the one or more criteria for selecting the first plurality of grants may be that the first plurality of grants provide resources ending at substantially a same time. In an example, the grants may be for cells belonging to different timing advance groups using different NTA values. In an example, if the first plurality of grants provide resources ending at a same SFN and subframe number, the resources of the first plurality of grants end substantially at a same time. For the example in FIG. 18, Grant 2, Grant 3 and Grant 5 may be processed together/jointly.

In an example embodiment, a wireless device may receive a plurality of grants/DCIs from one or more base stations (e.g., eLTE eNB and/or NR gNB, etc.). An example is shown in FIG. 18 where a wireless device receives five grants for different TTIs/transmission durations/numerologies on three cells. A grant/DCI may indicate the resources and transmission parameters for the wireless device (e.g., modulation and coding scheme, timing e.g. time/slot/subframe, resource blocks, power control parameters, HARQ parameters, etc.). In an example, the grant/DCI may indicate cell and/or numerology and/or TTI/transmission duration to be used for transmission. Other transmission parameters may be indicated by a grant. A grant may be for a subframe/slot/mini-slot (TTI/numerology) with a first duration starting from the first duration starting time and ending at the first duration ending time. In an example, the wireless device may process (e.g., allocate resources from) a first plurality of grants of the plurality of grants together (e.g., jointly and/or substantially at a same time). In an example, a grant of the first plurality of grants processed together may have a grant size of e.g., N bytes for a first TTI/transmission duration/numerology. One or more logical channels may be mapped to the first TTI/transmission duration/numerology. A logical channel prioritization procedure in multiplexing and assembly entity of the wireless device may allocate the N bytes capacity of the grant to the one or more logical channels considering a plurality of parameters, such as buffer sizes of the one or more logical channels, priorities of the one or more logical channels on the first TTI/transmission duration/numerology, PBR, etc. to create a MAC PDU for transmission on the indicated cell/numerology/TTI/transmission duration in the grant. The physical layer may create a transport block using the MAC PDU and may calculate a transmission power using at least power control command in the grant and map the transport block to the resources indicated by the grant. The wireless device may transmit the transport block. In an example, the wireless device may select/determine the first plurality of grants from the plurality of grants based on one or more criteria. In an example, the wireless device may group a second plurality of the first plurality of grants/DCIs into a first grouped grant. Example B embodiments describe criteria for determining/selecting the second plurality of grants for grouping. The wireless device may perform logical channel prioritization procedure to multiplex data from one or more logical channels for a grant or grouped grant. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example embodiment, the one or more criteria for selecting the first plurality of grants may be that the first plurality of grants provide resources that overlap in time. In an example, the grants may be for cells belonging to different timing advance groups using different NTA values. In an example, if the first plurality of grants provide resources starting at a same SFN and subframe number, the resources of the first plurality of grants start substantially at a same time. For the example in FIG. 18, Grant 1 and Grant 4 or Grant 2, Grant 3 and Grant 5 may be processed together/jointly.

In an example embodiment, a wireless device may receive a plurality of grants/DCIs from one or more base stations (e.g., eLTE eNB and/or NR gNB, etc.). An example is shown in FIG. 18 where a wireless device receives five grants for different TTIs/transmission durations/numerologies on three cells. A grant/DCI may indicate the resources and transmission parameters for the wireless device (e.g., modulation and coding scheme, timing e.g. time/slot/subframe, resource blocks, power control parameters, HARQ parameters, etc.). In an example, the grant/DCI may indicate cell and/or numerology and/or TTI/transmission duration to be used for transmission. Other transmission parameters may be indicated by a grant. A grant may be for a subframe/slot/mini-slot (TTI/numerology) with a first duration starting from the first duration starting time and ending at the first duration ending time. In an example, the wireless device may process (e.g., allocate resources from) a first plurality of grants of the plurality of grants together (e.g., jointly and/or substantially at a same time). In an example, a grant of the first plurality of grants processed together may have a grant size of e.g., N bytes for a first TTI/transmission duration/numerology. One or more logical channels may be mapped to the first TTI/transmission duration/numerology. A logical channel prioritization procedure in multiplexing and assembly entity of the wireless device may allocate the N bytes capacity of the grant to the one or more logical channels considering a plurality of parameters, such as buffer sizes of the one or more logical channels, priorities of the one or more logical channels on the first TTI/transmission duration/numerology, PBR, etc. to create a MAC PDU for transmission on the indicated cell/numerology/TTI/transmission duration in the grant. The physical layer may create a transport block using the MAC PDU and may calculate a transmission power using at least power control command in the grant and map the transport block to the resources indicated by the grant. The wireless device may transmit the transport block. In an example, the wireless device may select/determine the first plurality of grants from the plurality of grants based on one or more criteria. In an example, the wireless device may group a second plurality of the first plurality of grants into a first grouped grant. Example B embodiments describe criteria for determining/selecting the second plurality of grants for grouping. The wireless device may perform logical channel prioritization procedure to multiplex data from one or more logical channels for a grant or grouped grant. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example embodiment, the one or more criteria for selecting the first plurality of grants may be that the first plurality of grants provide resources from a same TTI duration/numerology type. For the example in FIG. 18, Grant 2, Grant 3, Grant 4 and Grant 5 may be processed together/jointly.

In an example embodiment, a wireless device may receive a plurality of grants/DCIs from one or more base stations (e.g., eLTE eNB and/or NR gNB, etc.). An example is shown in FIG. 18 where a wireless device receives five grants for different TTIs/numerologies on three cells. A grant/DCI may indicate the resources and transmission parameters for the wireless device (e.g., modulation and coding scheme, timing e.g. time/slot/subframe, resource blocks, power control parameters, HARQ parameters, etc.). In an example, the grant/DCI may indicate cell and/or numerology and/or TTI/transmission duration to be used for transmission. Other transmission parameters may be indicated by a grant. A grant may be for a subframe/slot/mini-slot (TTI/numerology) with a first duration starting from the first duration starting time and ending at the first duration ending time. In an example, the wireless device may process (e.g., allocate resources from) a first plurality of grants of the plurality of grants together (e.g., jointly and/or substantially at a same time). In an example, a grant of the first plurality of grants processed together may have a grant size of e.g., N bytes for a first TTI/transmission duration/numerology. One or more logical channels may be mapped to the first TTI/transmission duration/numerology. A logical channel prioritization procedure in multiplexing and assembly entity of the wireless device may allocate the N bytes capacity of the grant to the one or more logical channels considering a plurality of parameters, such as buffer sizes of the one or more logical channels, priorities of the one or more logical channels on the first TTI/transmission duration/numerology, PBR, etc. to create a MAC PDU for transmission on the indicated cell/numerology/TTI/transmission duration in the grant. The physical layer may create a transport block using the MAC PDU and may calculate a transmission power using at least power control command in the grant and map the transport block to the resources indicated by the grant. The wireless device may transmit the transport block. In an example, the wireless device may select/determine the first plurality of grants from the plurality of grants based on one or more criteria. In an example, the wireless device may group a second plurality of the first plurality of grants into a first grouped grant. Example B embodiments describe criteria for determining/selecting the second plurality of grants for grouping. The wireless device may perform logical channel prioritization procedure to multiplex data from one or more logical channels for a grant or grouped grant. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example embodiment, the one or more criteria for selecting the first plurality of grants may be that the first plurality of grants provide resources from a same cell type. For the example in FIG. 18, if cell 1 and cell 2 are LAA cells and cell 3 is a licensed cell, Grant 1, Grant 2, Grant 3 and Grant 4 may be processed together/jointly.

In an example embodiment, a wireless device may receive a plurality of grants/DCIs from one or more base stations (e.g., eLTE eNB and/or NR gNB, etc.). An example is shown in FIG. 18 where a wireless device receives five grants for different TTIs/numerologies on three cells. A grant/DCI may indicate the resources and transmission parameters for the wireless device (e.g., modulation and coding scheme, timing e.g. time/slot/subframe, resource blocks, power control parameters, HARQ parameters, etc.). In an example, the grant/DCI may indicate cell and/or numerology and/or TTI/transmission duration to be used for transmission. Other transmission parameters may be indicated by a grant. A grant may be for a subframe/slot/mini-slot (TTI/numerology) with a first duration starting from the first duration starting time and ending at the first duration ending time. In an example, the wireless device may process (e.g., allocate resources from) a first plurality of grants of the plurality of grants together (e.g., jointly and/or substantially at a same time). In an example, a grant of the first plurality of grants processed together may have a grant size of e.g., N bytes for a first TTI/transmission duration/numerology. One or more logical channels may be mapped to the first TTI/transmission duration/numerology. A logical channel prioritization procedure in multiplexing and assembly entity of the wireless device may allocate the N bytes capacity of the grant to the one or more logical channels considering a plurality of parameters, such as buffer sizes of the one or more logical channels, priorities of the one or more logical channels on the first TTI/transmission duration/numerology, PBR, etc. to create a MAC PDU for transmission on the indicated cell/numerology/TTI/transmission duration in the grant. The physical layer may create a transport block using the MAC PDU and may calculate a transmission power using at least power control command in the grant and map the transport block to the resources indicated by the grant. The wireless device may transmit the transport block. In an example, the wireless device may select/determine the first plurality of grants from the plurality of grants based on one or more criteria. In an example, the wireless device may group a second plurality of the first plurality of grants into a first grouped grant. Example B embodiments describe criteria for determining/selecting the second plurality of grants for grouping. The wireless device may perform logical channel prioritization procedure to multiplex data from one or more logical channels for a grant or grouped grant. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example embodiment, the one or more criteria for selecting the first plurality of grants may be that the first plurality of grants provide resources from a same band. For the example in FIG. 18, cell 1 and cell 2 are from band 1 and cell 3 is from band 2. Grant 1, Grant 2, Grant 3 and Grant 4 may be processed together/jointly.

In an example embodiment, a wireless device may receive a plurality of grants/DCIs from one or more base stations (e.g., eLTE eNB and/or NR gNB, etc.). An example is shown in FIG. 18 where a wireless device receives five grants for different TTIs/transmission durations/numerologies on three cells. A grant/DCI may indicate the resources and transmission parameters for the wireless device (e.g., modulation and coding scheme, timing e.g. time/slot/subframe, resource blocks, power control parameters, HARQ parameters, etc.). In an example, the grant/DCI may indicate cell and/or numerology and/or TTI/transmission duration to be used for transmission. Other transmission parameters may be indicated by a grant. A grant may be for a subframe/slot/mini-slot (TTI/numerology) with a first duration starting from the first duration starting time and ending at the first duration ending time. In an example, the wireless device may process (e.g., allocate resources from) a first plurality of grants of the plurality of grants together (e.g., jointly and/or substantially at a same time). In an example, a grant of the first plurality of grants processed together may have a grant size of e.g., N bytes for a first TTI/transmission duration/numerology. One or more logical channels may be mapped to the first TTI/transmission duration/numerology. A logical channel prioritization procedure in multiplexing and assembly entity of the wireless device may allocate the N bytes capacity of the grant to the one or more logical channels considering a plurality of parameters, such as buffer sizes of the one or more logical channels, priorities of the one or more logical channels on the first TTI/transmission duration/numerology, PBR, etc. to create a MAC PDU for transmission on the indicated cell/numerology/TTI in the grant. The physical layer may create a transport block using the MAC PDU and may calculate a transmission power using at least power control command in the grant and map the transport block to the resources indicated by the grant. The wireless device may transmit the transport block. In an example, the wireless device may select/determine the first plurality of grants from the plurality of grants based on one or more criteria. In an example, the wireless device may group a second plurality of the first plurality of grants into a first grouped grant. Example B embodiments describe criteria for determining/selecting the second plurality of grants for grouping. The wireless device may perform logical channel prioritization procedure to multiplex data from one or more logical channels for a grant or grouped grant. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example embodiment, the one or more criteria for selecting the first plurality of grants may be that the first plurality of grants are received at the wireless device at substantially a same time. In an example, the grants may be received on cells belonging to different timing advance groups using different NTA values. In an example, if the first plurality of grants are received at the wireless device at a same SFN and subframe number, the resources of the first plurality of grants end substantially at a same time. For the example in FIG. 18, Grant 1 and Grant 3 may be processed together/jointly.

Figure 19:
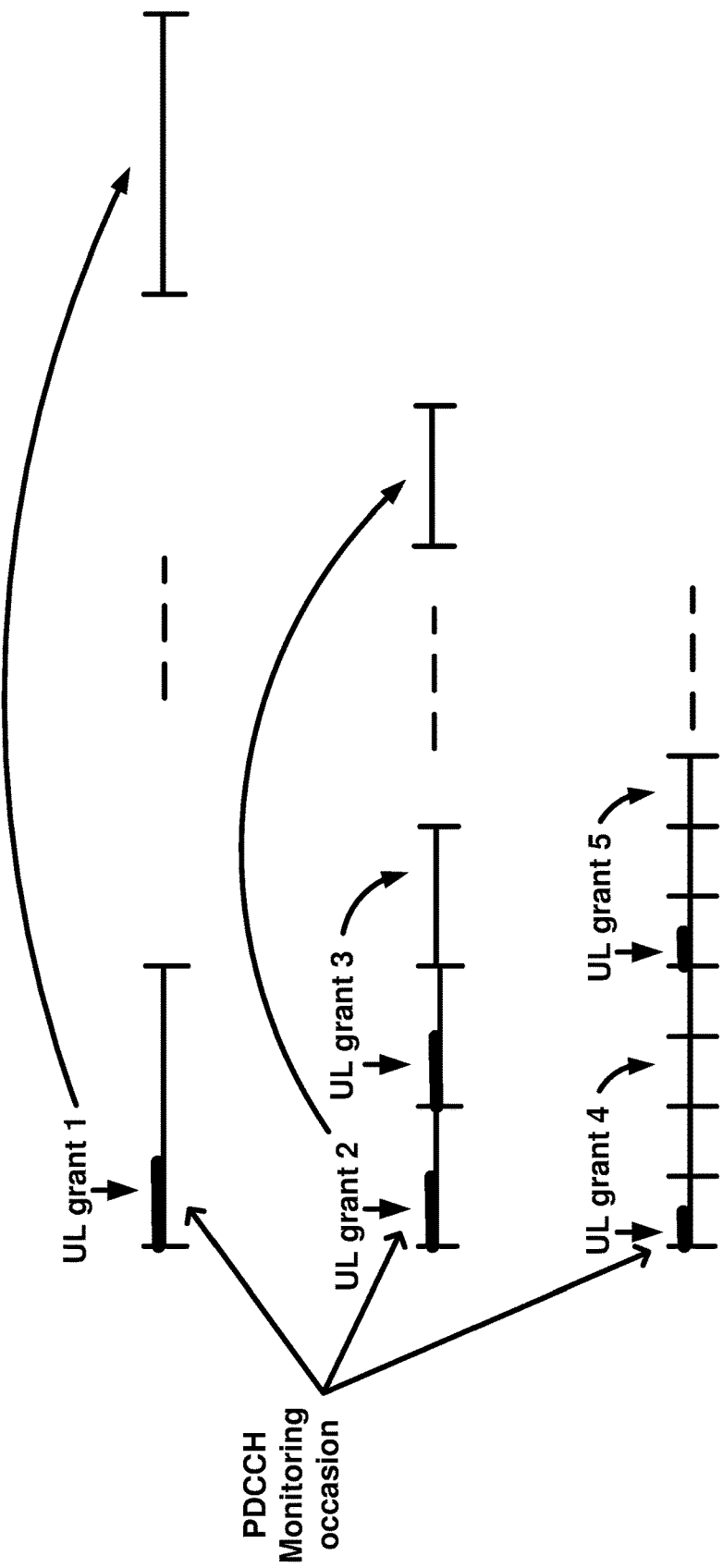
FIG. 19 is a diagram of an example reception of grants as per an aspect of an embodiment of the present disclosure.

In an example embodiment, as shown in FIG. 19, a wireless device may receive from a base station at least one message comprising configuration parameters. The at least one message may comprise first configuration parameters of a plurality of cells. In an example, one or more first cells in the plurality of cells may be licensed cells. In an example, one or more second cells in the plurality of cells may be unlicensed. In an example, one or more third cells in the plurality of cells may operate in millimeter wave frequencies. In an example, the wireless device may receive second configuration parameters of a plurality of logical channels. The configuration parameters of the plurality of logical channels may comprise a plurality of parameters for each logical channel. The plurality of parameters may comprise a maximum transmission duration, one or more allowed serving cells, a priority, a prioritized bit rate (PBR), etc.

In an example, the wireless device may receive a plurality of uplink grants on the plurality of cells. The plurality of uplink grants may be received in different transmission time intervals. The plurality of uplink grants may indicate radio resources in the plurality of cells. The plurality of uplink grants may indicate other transmission parameters comprising modulation and coding scheme, power control parameters, HARQ related parameters, etc. In an example, the wireless device may select a first plurality of uplink grants in the plurality of uplink grants in response to the first plurality of uplink grants being received during one or more coinciding time durations that the wireless device is configured to monitor a control channel on the plurality of cells. In an example, the wireless device may multiplex data from one or more logical channels in the plurality of logical channels into one or more transport blocks by processing together the first plurality of uplink grants in the plurality of uplink grants. For example, in FIG. 19, uplink grant 1, uplink grant 2 and uplink grant 4 are received during coinciding time durations configured for the wireless device to monitor a control channel. The wireless device may select the uplink grant 1, uplink grant 2 and uplink grant 4. The wireless device may process the uplink grant 1, uplink grant 2, and uplink grant 4 together.

In an example the one or more logical channels in the plurality of logical channels may be mapped to transmission durations of the first plurality of uplink grants. The second configuration parameters of the plurality of logical channels may indicate that the one or more logical channels of the plurality of logical channels are mapped to the transmission durations of the first plurality of uplink grants. The wireless device may transmit, via the one or more resource blocks, the one or more transport blocks corresponding to the first plurality of uplink grants.

In an example embodiment, a wireless device may receive a plurality of grants/DCIs from one or more base stations (e.g., eLTE eNB and/or NR gNB, etc.). An example is shown in FIG. 18 where a wireless device receives five grants for different TTIs/durations/numerologies on three cells. A grant/DCI may indicate the resources and transmission parameters for the wireless device (e.g., modulation and coding scheme, timing e.g. time/slot/subframe, resource blocks, power control parameters, HARQ parameters, etc.). In an example, the grant/DCI may indicate cell and/or numerology and/or TTI/transmission duration to be used for transmission. Other transmission parameters may be indicated by a grant. A grant may be for a subframe/slot/mini-slot (TTI/numerology) with a first duration starting from the first duration starting time and ending at the first duration ending time. In an example, the wireless device may process (e.g., allocate resources from) a first plurality of grants of the plurality of grants together (e.g., jointly and/or substantially at a same time). In an example, a grant of the first plurality of grants processed together may have a grant size of e.g., N bytes for a first TTI/transmission duration/numerology. One or more logical channels may be mapped to the first TTI/transmission duration/numerology. A logical channel prioritization procedure in multiplexing and assembly entity of the wireless device may allocate the N bytes capacity of the grant to the one or more logical channels considering a plurality of parameters, such as buffer sizes of the one or more logical channels, priorities of the one or more logical channels on the first TTI/transmission duration/numerology, PBR, etc. to create a MAC PDU for transmission on the indicated cell/numerology/TTI/transmission duration in the grant. The physical layer may create a transport block using the MAC PDU and may calculate a transmission power using at least power control command in the grant and map the transport block to the resources indicated by the grant. The wireless device may transmit the transport block. In an example, the wireless device may select/determine the first plurality of grants from the plurality of grants based on one or more criteria. In an example, the wireless device may group a second plurality of the first plurality of grants into a first grouped grant. Example B embodiments describe criteria for determining/selecting the second plurality of grants for grouping. The wireless device may perform logical channel prioritization procedure to multiplex data from one or more logical channels for a grant or grouped grant. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example embodiment, the one or more criteria for selecting the first plurality of grants may be that the first plurality of grants may be received at the wireless device in a time window (e.g., n subframes, n=1, 2, 3, . . . ). In an example the time window may be pre-configured. In an example, the time window may be semi-statically (e.g., using RRC) or dynamically (e.g., using physical layer and/or MAC layer signaling such as using DCI, MAC CE, etc.) indicated to the wireless device.

Example B

A wireless device may select a group of uplink grants (DCIs) for uplink multiplexing process. Example embodiments enhance uplink multiplexing process by selecting a set of uplink grants according to a predefined criteria. Example embodiments may aggregate the grant size (capacity) of the set of uplink grants and construct a PDU for grants of the set of uplink grants. Example embodiments may reduce the processing requirements for uplink multiplexing in a UE.

Figure 20:
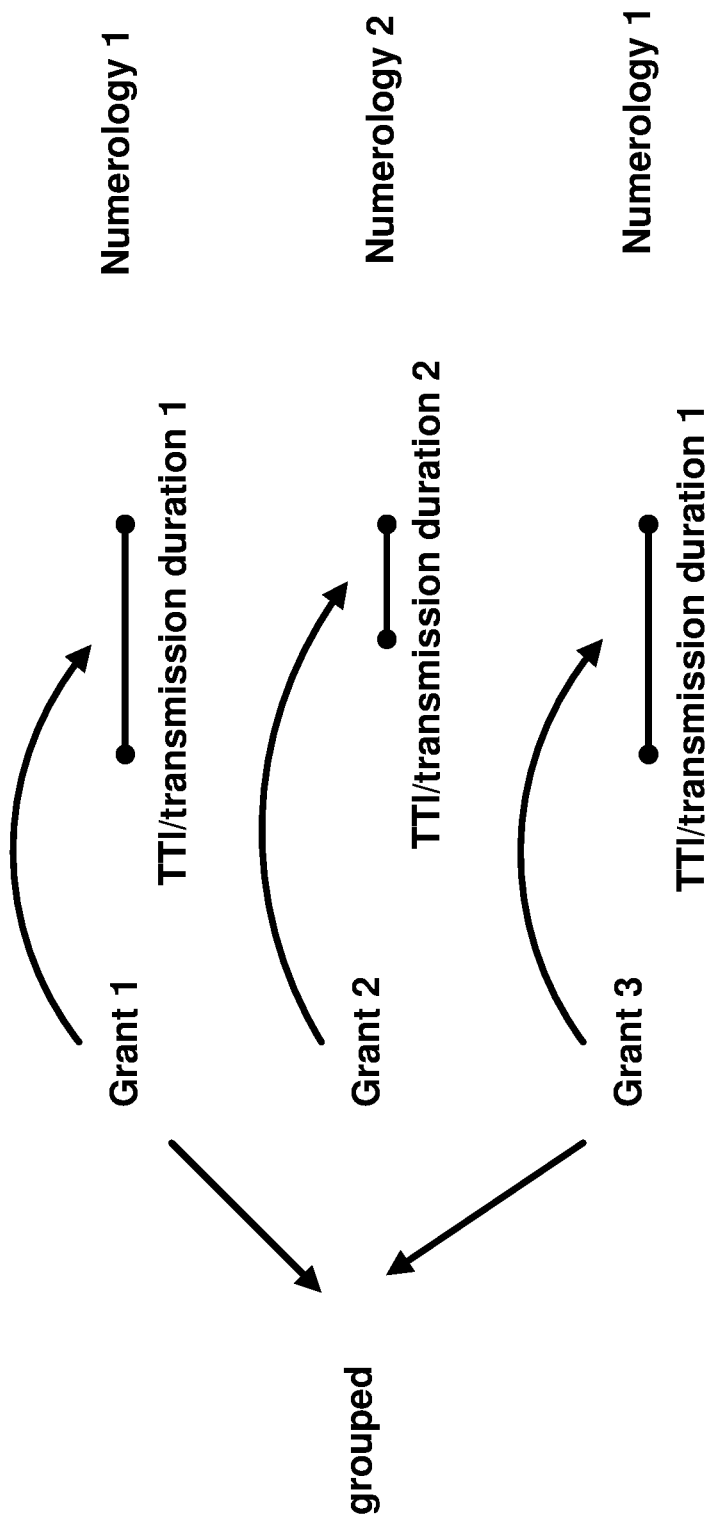
FIG. 20 is a diagram of an example grouping of grants as per an aspect of an embodiment of the present disclosure.

In an example embodiment, a wireless device may receive one or more messages comprising configuration parameters of a plurality of logical channels. In an example, the configuration parameters may indicate that a logical channel may be mapped to one or more TTIs/transmission durations/numerologies. In an example, the configuration parameters may indicate the one or more TTIs/transmission durations/numerologies that a logical channel may be mapped to. In an example, the wireless device may receive a plurality of DCIs. A DCI in the plurality of DCIs may comprise an uplink resource grant. In an example, the DCI may indicate TTI/transmission duration/numerology and/or cell. The DCI may comprise transmission parameters e.g., timing, transmission time/slot/subframe, resources, one or more power control commands, one or more HARQ parameters, etc. The wireless device may perform logical channel prioritization procedure to multiplex data from one or more logical channels for a grant or grouped grant. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example, the plurality of DCIs/grants may be processed together based on example criteria described in Example A embodiments. In an example, the wireless device may group the plurality of DCIs/grants into one or more DCI/grant groups according to one or more criteria. In an example, the one or more criteria may comprise DCIs/grants in a first DCI/grant group comprise a first indication of TTI/transmission duration/numerology. In an example, a logical channel prioritization procedure may be applied to aggregate of a group of grants with capacity equal to sum of capacities of the grants in the group. In an example, the logical channel prioritization procedure may allocate data from logical channels that may be mapped to the group of grants considering for example, the priorities of the logical channels that may be mapped to the group of grants on the TTI/transmission duration/numerology indicated for the grants in the group of grants, PBRs of the logical channels that may be mapped to the group of grants on the TTI/transmission duration/numerology indicated for the grants in the group of grants, the sum of capacities of the grants in the group of grants, etc. The MAC entity may create a MAC PDU for a grant in the group of grants. Physical layer may create a transport block for a MAC PDU and map the transport block to the resources indicated in a grant corresponding to a MAC PDU. The wireless device may transmit the transport block. In an example, the DCIs/grants in the first DCI/grant group may allocate resources starting at substantially a same time. In an example, the DCIs/grants in the first DCI/grant group may allocate resources ending at substantially a same time. In an example, the DCIs/grants in the first DCI/grant group may allocate resources from a same cell type. In an example, the DCIs/grants in the first DCI/grant group may allocate resources from a same band. In an example, the DCIs/grants in the first DCI/grant group may be received at the wireless device at substantially a same time. In an example, the DCIs/grants in the first DCI/grant group may be received at the wireless device during a configured time window. In an example, sum of capacities of grants from the first grouped grant may be allocated jointly to one or more logical channels. Example grouping of grants is illustrated in FIG. 20.

In an example embodiment, a wireless device may receive one or more messages comprising configuration parameters of a plurality of logical channels. In an example, the configuration parameters may indicate that a logical channel may be mapped to one or more TTIs/transmission durations/numerologies. In an example, the configuration parameters may indicate the one or more TTIs/transmission durations/numerologies that a logical channel may be mapped to. In an example, the wireless device may receive a plurality of DCIs. A DCI in the plurality of DCIs may comprise an uplink resource grant. In an example, the DCI may indicate TTI/transmission duration/numerology and/or cell. The DCI may comprise transmission parameters e.g., timing, transmission time/slot/subframe, resources, one or more power control commands, one or more HARQ parameters, etc. The wireless device may perform logical channel prioritization procedure to multiplex data from one or more logical channels for a grant or grouped grant. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example, the plurality of DCIs/grants may be processed together based on example criteria described in Example A embodiments. In an example, the wireless device may group the plurality of DCIs/grants into one or more DCI/grant groups according to one or more criteria. In an example, the one or more criteria may comprise DCIs/grants in a first DCI/grant group indicate a same cell type (e.g., licensed, unlicensed, etc.). In an example, the one or more criteria may comprise DCIs/grants in a first DCI/grant group indicate a same band (e.g., sub-GHz, mm-wave, etc.). In an example, a logical channel prioritization procedure may be applied to aggregate of a group of grants with capacity equal to sum of capacities of the grants in the group. In an example, the logical channel prioritization procedure may allocate data from logical channels that may be mapped to the group of grants considering for example, the priorities of the logical channels that may be mapped to the group of grants on the TTI/transmission duration/numerology indicated for the grants in the group of grants, PBRs of the logical channels that may be mapped to the group of grants on the TTI/transmission duration/numerology indicated for the grants in the group of grants, the sum of capacities of the grants in the group of grants, etc. The MAC entity may create a MAC PDU for a grant in the group of grants. Physical layer may create a transport block for a MAC PDU and map the transport block to the resources indicated in a grant corresponding to a MAC PDU. The wireless device may transmit the transport block. In an example, the DCIs/grants in the first DCI/grant group may allocate resources starting at substantially a same time. In an example, the DCIs/grants in the first DCI/grant group may allocate resources ending at substantially a same time. In an example, the DCIs/grants in the first DCI/grant group may allocate resources from a same cell type. In an example, the DCIs/grants in the first DCI/grant group may allocate resources from a same band. In an example, the DCIs/grants in the first DCI/grant group may be received at the wireless device at substantially a same time. In an example, the DCIs/grants in the first DCI/grant group may be received at the wireless device during a configured time window. In an example, sum of capacities of grants from the first grouped grant may be allocated jointly to one or more logical channels.

In an example embodiment, a wireless device may receive one or more messages comprising configuration parameters of a plurality of logical channels. In an example, the configuration parameters may indicate that a logical channel may be mapped to one or more TTIs/transmission durations/numerologies. In an example, the configuration parameters may indicate the one or more TTIs/transmission durations/numerologies that a logical channel may be mapped to. In an example, the wireless device may receive a plurality of DCIs. A DCI in the plurality of DCIs may comprise an uplink resource grant. In an example, the DCI may indicate TTI/transmission duration/numerology and/or cell. The DCI may comprise transmission parameters e.g., timing, transmission time/slot/subframe, resources, one or more power control commands, one or more HARQ parameters, etc. The wireless device may perform logical channel prioritization procedure to multiplex data from one or more logical channels for a grant or grouped grant. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example, the plurality of DCIs/grants may be processed together based on example criteria described in Example A embodiments. In an example, the wireless device may group the plurality of DCIs/grants into one or more DCI/grant groups according to one or more criteria. In an example, the one or more criteria may comprise logical channels mappings to the DCIs/grants in a first DCI/grant group are the same, e.g., the same one or more logical channels are mapped to the TTIs/transmission durations/numerologies indicated in the DCIs/grants in the first DCI/grant group and/or the same one or more logical channels have a same logical channel priorities. In an example, a logical channel prioritization procedure may be applied to aggregate of a group of grants with capacity equal to sum of capacities of the grants in the group. In an example, the logical channel prioritization procedure may allocate data from logical channels that may be mapped to the group of grants considering for example, the priorities of the logical channels that may be mapped to the group of grants on the TTI/transmission duration/numerology indicated for the grants in the group of grants, PBRs of the logical channels that may be mapped to the group of grants on the TTI/transmission duration/numerology indicated for the grants in the group of grants, the sum of capacities of the grants in the group of grants, etc. The MAC entity may create a MAC PDU for a grant in the group of grants. Physical layer may create a transport block for a MAC PDU and map the transport block to the resources indicated in a grant corresponding to a MAC PDU. The wireless device may transmit the transport block. In an example, the DCIs/grants in the first DCI/grant group may allocate resources starting at substantially a same time. In an example, the DCIs/grants in the first DCI/grant group may allocate resources ending at substantially a same time. In an example, the DCIs/grants in the first DCI/grant group may allocate resources from a same cell type. In an example, the DCIs/grants in the first DCI/grant group may allocate resources from a same band. In an example, the DCIs/grants in the first DCI/grant group may be received at the wireless device at substantially a same time. In an example, the DCIs/grants in the first DCI/grant group may be received at the wireless device during a configured time window. In an example, sum of capacities of grants from the first grouped grant may be allocated jointly to one or more logical channels.

Example C

Example embodiments improves uplink multiplexing efficiency by processing uplink grants in an order based on pre-defined criteria.

In an example embodiment, a wireless device may receive one or more messages comprising configuration parameters of a plurality of logical channels. In an example, the configuration parameters may indicate that a logical channel may be mapped to one or more TTIs/transmission durations/numerologies. In an example, the configuration parameters may indicate the one or more TTIs/transmission durations/numerologies that a logical channel may be mapped to. In an example, the configuration parameters may indicate one or more priorities of a logical channel on one or more TTIs/transmission durations/numerologies. In an example, the configuration parameters may indicate a priority of a logical channel on each of a plurality of TTIs/transmission durations/numerologies. In an example, the wireless device may receive a plurality of DCIs. A DCI in the plurality of DCIs may comprise an uplink resource grant. In an example, the DCI may indicate TTI/transmission duration/numerology and/or cell. The DCI may comprise transmission parameters e.g., timing, transmission time/slot/subframe, resources, one or more power control commands, one or more HARQ parameters, etc. The wireless device may perform logical channel prioritization procedure to multiplex data from one or more logical channels for a grant or grouped grant. Example A embodiments describe example criteria for processing a plurality of grants/grouped grants together. Example B embodiments describe example criteria for grouping grants. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example, a first plurality of grants and/or grouped grants may be processed jointly (e.g., processed substantially at a same time). In an example, the first plurality of grants and/or grouped grants may allocate resources starting at substantially a same time. In an example, the first plurality of grants and/or grouped grants may allocate resources ending at substantially a same time.

Figure 21:
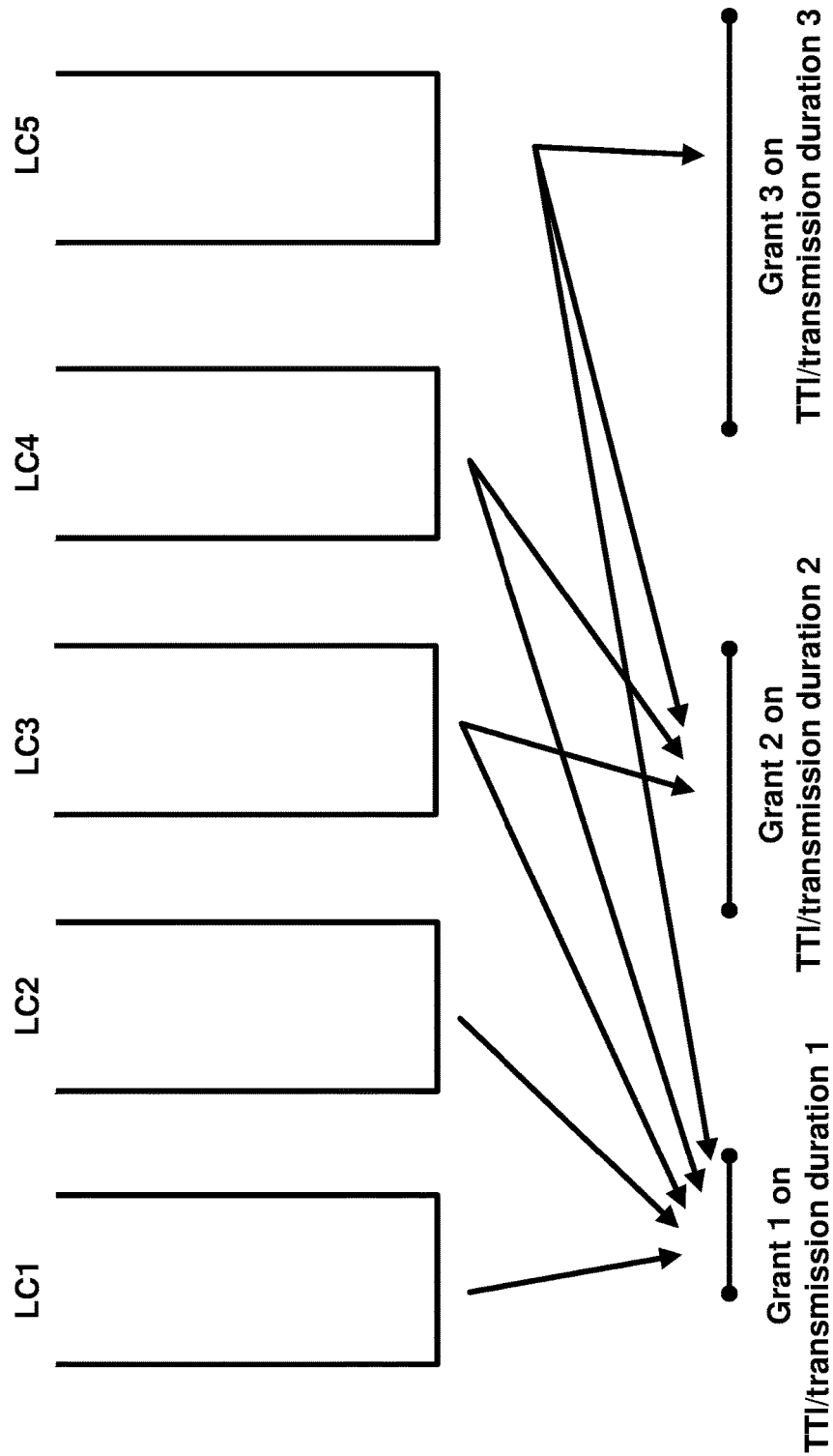
FIG. 21 is a diagram of an example sorting of grants as per an aspect of an embodiment of the present disclosure.

In an example, the first plurality of grants and/or grouped grants may allocate resources from a same cell type. In an example, the first plurality of grants and/or grouped grants may allocate resources from a same band. In an example, the first plurality of grants and/or grouped grants may be received at the wireless device at substantially a same time. In an example, the first plurality of grants and/or grouped grants may be received at the wireless device during a configured time window. In an example, the wireless device may sort the first plurality of grants and/or group grants according to number of logical channels that may be mapped to a TTI/transmission duration/numerology indicated in each of the first plurality of grants and/or grouped grants. In an example, the wireless device may start allocating resources to the sorted first plurality of grants and/or grouped grants sequentially (e.g., starting from a grant/grouped grant in the first plurality of grants and/or grouped grants wherein smallest number of logical channels may be mapped to the TTI/transmission duration/numerology indicated in the grant/grouped grant). In an example, smallest number of logical channels may be mapped to a TTI/transmission duration/numerology with longest TTI/transmission duration. In an example, sorting the first plurality of grants according to the number of logical channels that may be mapped to the TTI/transmission duration/numerology indicated in the grant may be equivalent to sorting the first plurality of grants according to the TTI/transmission duration of TTI/transmission duration/numerology indicated in the first plurality of grants. Example sorting of grants is illustrated in FIG. 21. In an example, a logical channel prioritization procedure may be applied to a grant or a grouped grant. In an example, the logical channel prioritization procedure may allocate data from logical channels that may be mapped to the grant/grouped grant considering for example, the priorities of the logical channels that may be mapped to the TTI/transmission duration/numerology indicated in the grant/grouped grant, PBRs of the logical channels that may be mapped to the TTI/transmission duration/numerology indicated grant/grouped grant, size of grant/grouped grant, etc. The MAC entity may create a MAC PDU for a grant. Physical layer may create a transport block for a MAC PDU and map the transport block to the resources indicated in the grant. The wireless device may transmit the transport block.

In an example embodiment, a wireless device may receive one or more messages comprising configuration parameters of a plurality of logical channels. In an example, the configuration parameters may indicate that a logical channel may be mapped to one or more TTIs/transmission durations/numerologies. In an example, the configuration parameters may indicate the one or more TTIs/transmission durations/numerologies that a logical channel may be mapped to. In an example, the configuration parameters may indicate one or more priorities of a logical channel on one or more TTIs/transmission durations/numerologies. In an example, the configuration parameters may indicate a priority of a logical channel on each of a plurality of TTIs/transmission durations/numerologies. In an example, the wireless device may receive a plurality of DCIs. A DCI in the plurality of DCIs may comprise an uplink resource grant. In an example, the DCI may indicate TTI/transmission duration/numerology and/or cell. The DCI may comprise transmission parameters e.g., timing, transmission time/slot/subframe, resources, one or more power control commands, one or more HARQ parameters, etc. The wireless device may perform logical channel prioritization procedure to multiplex data from one or more logical channels for a grant or grouped grant.

Figure 22:
FIG. 22 is a diagram of an example sorting of grants as per an aspect of an embodiment of the present disclosure.

Example A embodiments describe example criteria for processing a plurality of grants/grouped grants together. Example B embodiments describe example criteria for grouping grants. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example, a first plurality of grants and/or grouped grants may be processed jointly (e.g., processed substantially at a same time). In an example, the first plurality of grants and/or grouped grants may allocate resources starting at substantially a same time. In an example, the first plurality of grants and/or grouped grants may allocate resources ending at substantially a same time. In an example, the first plurality of grants and/or grouped grants may allocate resources from a same cell type. In an example, the first plurality of grants and/or grouped grants may allocate resources from a same band. In an example, the first plurality of grants and/or grouped grants may be received at the wireless device at substantially a same time. In an example, the first plurality of grants and/or grouped grants may be received at the wireless device during a configured time window. In an example, the wireless device may sort the first plurality of grants and/or grouped grants according to duration of a TTI/transmission duration indicated in each of the first plurality of grants and/or grouped grants. In an example, the wireless device may start allocating resources to the sorted first plurality of grants and/or grouped grants sequentially. In an example, the wireless device may start from a grant/grouped grant in the first plurality of grants and/or grouped grants wherein the TTI/transmission duration indicated in the grant/grouped grant has a longest duration. In an example, the wireless device may start from a grant/grouped grant in the first plurality of grants and/or grouped grants wherein the TTI/transmission duration indicated in the grant/grouped grant has a longest duration. Example sorting of grants is illustrated in FIG. 22. In an example, a logical channel prioritization procedure may be applied to a grant or a grouped grant. In an example, the logical channel prioritization procedure may allocate data from logical channels that may be mapped to the grant/grouped grant considering for example, the priorities of the logical channels that may be mapped to the TTI/transmission duration indicated in the grant/grouped grant, PBRs of the logical channels that may be mapped to the TTI/transmission duration/numerology indicated grant/grouped grant, size of grant/grouped grant, etc. The MAC entity may create a MAC PDU for a grant. Physical layer may create a transport block for a MAC PDU and map the transport block to the resources indicated in the grant. The wireless device may transmit the transport block.

In an example embodiment, a wireless device may receive one or more messages comprising configuration parameters of a plurality of logical channels. In an example, the configuration parameters may indicate that a logical channel may be mapped to one or more TTIs/transmission durations/numerologies. In an example, the configuration parameters may indicate the one or more TTIs/transmission durations/numerologies that a logical channel may be mapped to. In an example, the configuration parameters may indicate one or more priorities of a logical channel on one or more TTIs/transmission durations/numerologies. In an example, the configuration parameters may indicate a priority of a logical channel on each of a plurality of TTIs/transmission durations/numerologies. In an example, the wireless device may receive a plurality of DCIs. A DCI in the plurality of DCIs may comprise an uplink resource grant. In an example, the DCI may indicate TTI/transmission duration/numerology and/or cell. The DCI may comprise transmission parameters e.g., timing, transmission time/slot/subframe, resources, one or more power control commands, one or more HARQ parameters, etc. The wireless device may perform logical channel prioritization procedure to multiplex data from one or more logical channels for a grant or grouped grant. Example A embodiments describe example criteria for processing a plurality of grants/grouped grants together. Example B embodiments describe example criteria for grouping grants. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example, a first plurality of grants and/or grouped grants may be processed jointly (e.g., processed substantially at a same time). In an example, the first plurality of grants and/or grouped grants may allocate resources starting at substantially a same time. In an example, the first plurality of grants and/or grouped grants may allocate resources ending at substantially a same time. In an example, the first plurality of grants and/or grouped grants may allocate resources from a same cell type. In an example, the first plurality of grants and/or grouped grants may allocate resources from a same band. In an example, the first plurality of grants and/or grouped grants may be received at the wireless device at substantially a same time. In an example, the first plurality of grants and/or grouped grants may be received at the wireless device during a configured time window. In an example, the wireless device may sort the first plurality of grants and/or grouped grants considering priorities of one or more logical channels mapped to TTI/transmission duration/numerology indicated in each of the first plurality of grants and/or grouped grants. In an example, the wireless device may sort the first plurality of grants and/or grouped grants according to priority of highest priority of one or more logical channels mapped to TTI/transmission duration/numerology indicated in each of the first plurality of grants and/or grouped grants. In an example, the wireless device may start allocating resources to the sorted first plurality of grants and/or grouped grants sequentially. In an example, if one or more logical channels mapped to a grant of the first plurality of grants comprises a logical channel that has highest priority among the plurality of logical channels mapped to the first plurality of grants, the grant is processed first. In an example, if a logical channel with highest priority is mapped to only a first TTI/transmission duration/numerology, the wireless device may process the grant(s) for the first TTI/transmission duration/numerology first. In an example, a logical channel prioritization procedure may be applied to a grant or a grouped grant. In an example, the logical channel prioritization procedure may allocate data from logical channels that may be mapped to the grant/grouped grant considering for example, the priorities of the logical channels that may be mapped to the TTI/transmission duration/numerology indicated in the grant/grouped grant, PBRs of the logical channels that may be mapped to the TTI/transmission duration/numerology indicated grant/grouped grant, size of grant/grouped grant, etc. The MAC entity may create a MAC PDU for a grant. Physical layer may create a transport block for a MAC PDU and map the transport block to the resources indicated in the grant. The wireless device may transmit the transport block.

Example D

Figure 23:
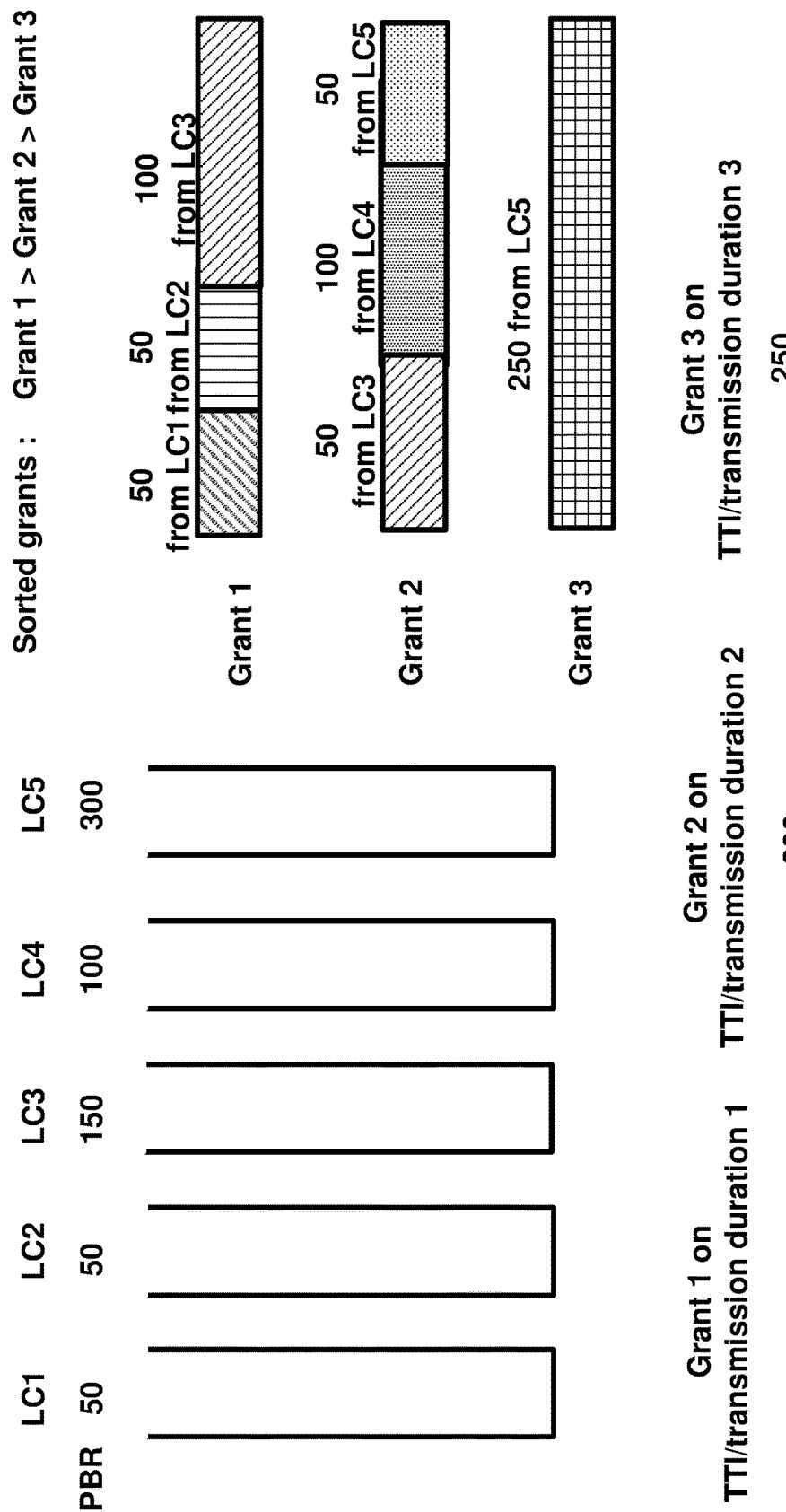
FIG. 23 is a diagram of an example sorting of grants as per an aspect of an embodiment of the present disclosure.

In an example embodiment, a wireless device may receive one or more messages comprising configuration parameters of a plurality of logical channels. In an example, the configuration parameters may indicate that a logical channel may be mapped to one or more TTIs/transmission durations/numerologies. In an example, the configuration parameters may indicate the one or more TTIs/transmission durations/numerologies that a logical channel may be mapped to. In an example, the configuration parameters may indicate one or more priorities of a logical channel on one or more TTIs/transmission durations/numerologies. In an example, the configuration parameters may indicate a priority of a logical channel on each of a plurality of TTIs/transmission durations/numerologies. In an example the configuration parameters may comprise a first parameter indicating a minimum bit rate for a logical channel. In an example, the value of the first parameter may depend at least in part on one or more QoS parameters of a bearer corresponding to the logical channel. In an example, the first parameter may indicate a prioritized bit rate (PBR) for a logical channel. In an example, the wireless device may receive a plurality of DCIs. A DCI in the plurality of DCIs may comprise an uplink resource grant. In an example, the DCI may indicate TTI/transmission duration/numerology and/or cell. The DCI may comprise transmission parameters e.g., timing, transmission time/slot/subframe, resources, one or more power control commands, one or more HARQ parameters, etc. The wireless device may perform logical channel prioritization procedure to multiplex data from one or more logical channels for a grant or grouped grant together. Example A embodiments describe example criteria for processing a plurality of grants/grouped grants together. Example B embodiments describe example criteria for grouping grants. In an example, the plurality of grants may be received by the UE at different times and may provide resources starting at or ending at different times. The plurality of grants may be received at one or more cell types (e.g., LAA, licensed, etc.) and/or bands (e.g., sub-GHz, mm-wave, etc.). In an example, a first plurality of grants and/or grouped grants may be processed jointly (e.g., processed substantially at a same time). In an example, the first plurality of grants and/or grouped grants may allocate resources starting at substantially a same time. In an example, the first plurality of grants and/or grouped grants may allocate resources ending at substantially a same time. In an example, the first plurality of grants and/or grouped grants may allocate resources from a same cell type. In an example, the first plurality of grants and/or grouped grants may allocate resources from a same band. In an example, the first plurality of grants and/or grouped grants may be received at the wireless device at substantially a same time. In an example, the first plurality of grants and/or grouped grants may be received at the wireless device during a configured time window. In an example embodiment, if PBR of a first logical channel is partially allocated in a first grant for a first TTI/transmission duration/numerology, when allocating resources to a second grant for a second TTI/numerology, the balance of PBR of the first logical channel may be allocated if the first logical channel is mapped to the second TTI/transmission duration/numerology. Example PBR allocation is illustrated in FIG. 23. In an example, a logical channel prioritization procedure may be applied to a grant or a grouped grant. In an example, the logical channel prioritization procedure may allocate data from logical channels that may be mapped to the grant/grouped grant considering for example, the priorities of the logical channels that may be mapped to the TTI/transmission duration/numerology indicated in the grant/grouped grant, PBRs of the logical channels that may be mapped to the TTI/transmission duration/numerology indicated grant/grouped grant, size of grant/grouped grant, etc. The MAC entity may create a MAC PDU for a grant. Physical layer may create a transport block for a MAC PDU and map the transport block to the resources indicated in the grant. The wireless device may transmit the transport block.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 24:
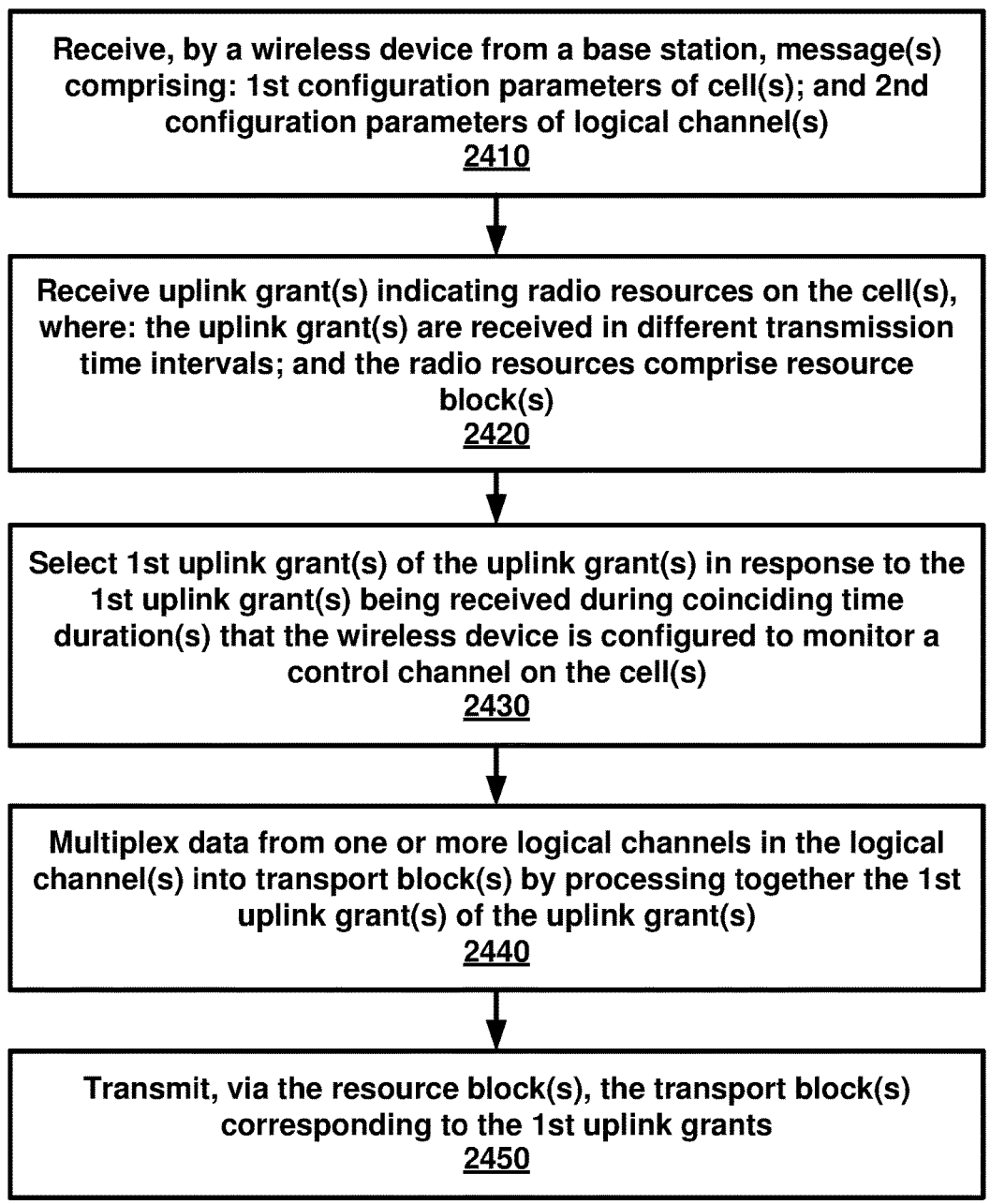
FIG. 24 is an example flow diagram as per an aspect of an embodiment of the present disclosure.

FIG. 24 is an example flow diagram as per an aspect of an embodiment of the present disclosure. At 2410, a wireless device may receive at least one message from a base station. The at least one message may comprise: first configuration parameters of a plurality of cells; and second configuration parameters of a plurality of logical channels. At 2420, a plurality of uplink grants may be received. The plurality of uplink grants may indicate radio resources on the plurality of cells. The plurality of uplink grants may be received in different transmission time intervals; and the radio resources may comprise one or more resource blocks. At 2430, a first plurality of uplink grants of the plurality of uplink grants may be selected in response to the first plurality of uplink grants being received during one or more coinciding time durations that the wireless device is configured to monitor a control channel on the plurality of cells. At 2440, data from one or more logical channels in the plurality of logical channels may be multiplexed into one or more transport blocks by processing together the first plurality of uplink grants of the plurality of uplink grants. At 2450, the one or more of transport blocks corresponding to the first plurality of uplink grants may be transmitted via the one or more resource blocks.

According to an embodiment, an uplink grant, in the plurality of uplink grants, may comprise a field indicating a transmission time for uplink transmission. According to an embodiment, the processing together the first plurality of uplink grants may comprise performing a logical channel prioritization procedure based on a sum of capacities of a second plurality of uplink grants in the first plurality of uplink grants. According to an embodiment, the second configuration parameters may indicate one or more priorities of the one or more logical channels. According to an embodiment, the multiplexing data from the one or more logical channels may comprise performing a logical channel prioritization procedure based on the one or more priorities. According to an embodiment, the second configuration parameters may indicate that each of the one or more logical channels are mapped to one or more corresponding transmission durations. According to an embodiment, the multiplexing the data from the one or more logical channels may be based on the one or more corresponding transmission durations. According to an embodiment, the second configuration parameters may indicate a prioritized bit rate corresponding to a logical channel in the one or more logical channels. According to an embodiment, the first plurality of uplink grants may comprise a plurality of transmission parameters for the one or more transport blocks. According to an embodiment, a third plurality of uplink grants in the first plurality of uplink grants may indicate resources with one or more same transmission durations.

Figure 25:
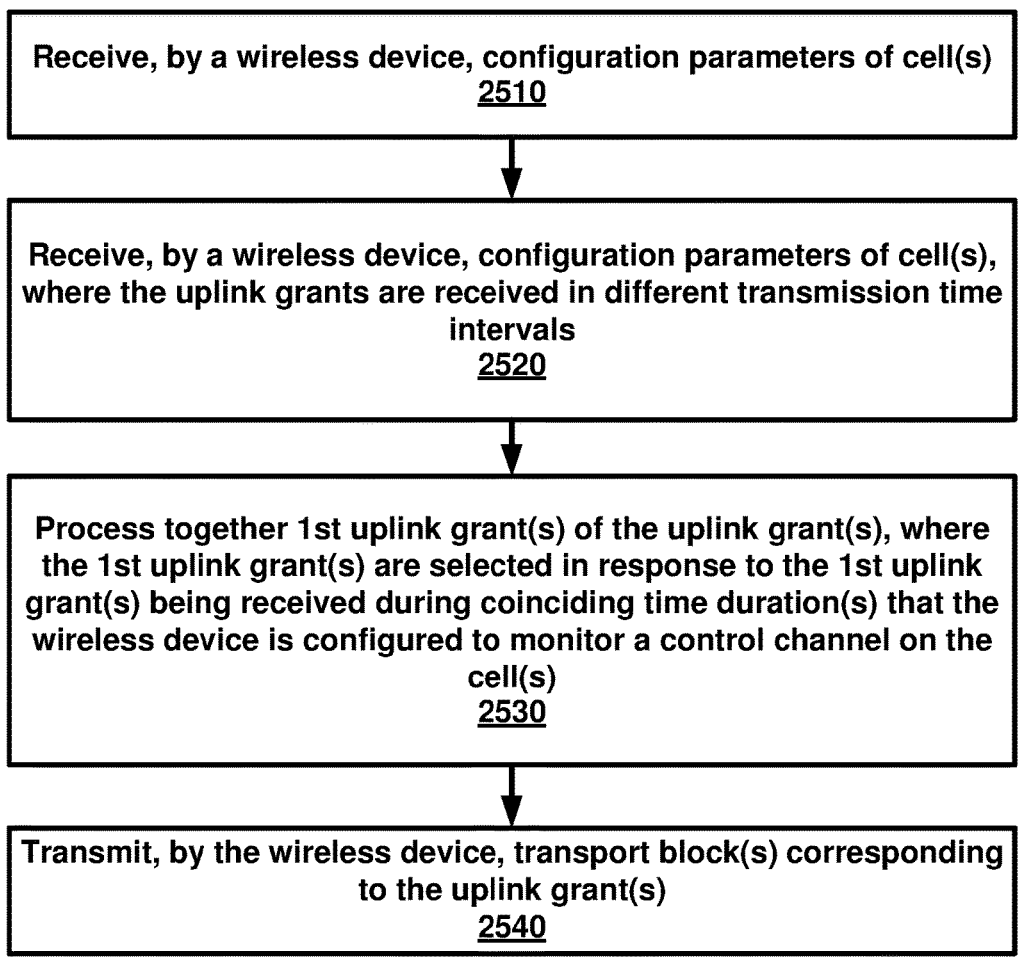
FIG. 25 is an example flow diagram as per an aspect of an embodiment of the present disclosure.

FIG. 25 is an example flow diagram as per an aspect of an embodiment of the present disclosure. At 2510, a wireless device may receive configuration parameters of a plurality of cells. At 2520, a plurality of uplink grants indicating radio resources on the plurality of cells may be received. The uplink grants may be received in different transmission time intervals. At 2530, a first plurality of uplink grants of the plurality of uplink grants may be processed together. The first plurality of uplink grants may be selected in response to the first plurality of uplink grants being received during one or more coinciding time durations that the wireless device is configured to monitor a control channel on the plurality of cells. At 2540, the wireless device may transmit a plurality of transport blocks corresponding to the plurality of uplink grants.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device from a base station, at least one message comprising:
      first configuration parameters of a plurality of cells; and
      second configuration parameters of a plurality of logical channels;
   receiving a plurality of uplink grants indicating radio resources on the plurality of cells, wherein:
      the plurality of uplink grants are received in different transmission time intervals; and
      the radio resources comprise one or more resource blocks;
   selecting a first plurality of uplink grants of the plurality of uplink grants in response to the first plurality of uplink grants being received during one or more coinciding time durations that the wireless device is configured to monitor a control channel on the plurality of cells;
   multiplexing data from one or more logical channels in the plurality of logical channels into one or more transport blocks by processing together the first plurality of uplink grants of the plurality of uplink grants; and
   transmitting, via the one or more resource blocks, the one or more transport blocks corresponding to the first plurality of uplink grants.

2. The method of claim 1, wherein an uplink grant, in the plurality of uplink grants, comprises a field indicating a transmission time for uplink transmission.

3. The method of claim 1, wherein the processing together the first plurality of uplink grants comprises performing a logical channel prioritization procedure based on a sum of capacities of a second plurality of uplink grants in the first plurality of uplink grants.

4. The method of claim 1, wherein the second configuration parameters indicate one or more priorities of the one or more logical channels.

5. The method of claim 4, wherein the multiplexing data from the one or more logical channels comprises performing a logical channel prioritization procedure based on the one or more priorities.

6. The method of claim 1, wherein the second configuration parameters indicate that each of the one or more logical channels are mapped to one or more corresponding transmission durations.

7. The method of claim 6, wherein the multiplexing the data from the one or more logical channels is based on the one or more corresponding transmission durations.

8. The method of claim 1, wherein the second configuration parameters indicate a prioritized bit rate corresponding to a logical channel in the one or more logical channels.

9. The method of claim 1, wherein the first plurality of uplink grants comprise a plurality of transmission parameters for the one or more transport blocks.

10. The method of claim 1, wherein a third plurality of uplink grants in the first plurality of uplink grants indicate resources with one or more same transmission durations.

11. A wireless device comprising:
   one or more processors; and
   memory storing instructions that, when executed by the one or more processors, cause the wireless device to:
      receive, from a base station, at least one message comprising:
         first configuration parameters of a plurality of cells; and
         second configuration parameters of a plurality of logical channels;
      receive a plurality of uplink grants indicating radio resources on the plurality of cells, wherein:
         the plurality of uplink grants are received in different transmission time intervals; and
         the radio resources comprise one or more resource blocks;

select a first plurality of uplink grants of the plurality of uplink grants in response to the first plurality of uplink grants being received during one or more coinciding time durations that the wireless device is configured to monitor a control channel on the plurality of cells;

multiplex data from one or more logical channels in the plurality of logical channels into one or more transport blocks by processing together the first plurality of uplink grants of the plurality of uplink grants; and transmit, via the one or more resource blocks, the one or more transport blocks corresponding to the first plurality of uplink grants.

12. The wireless device of claim 11, wherein an uplink grant, in the plurality of uplink grants, comprises a field indicating a transmission time for uplink transmission.

13. The wireless device of claim 11, wherein the processing together the first plurality of uplink grants comprises performing a logical channel prioritization procedure based on a sum of capacities of a second plurality of uplink grants in the first plurality of uplink grants.

14. The wireless device of claim 11, wherein the second configuration parameters indicate one or more priorities of the one or more logical channels.

15. The wireless device of claim 14, the multiplexing data from the one or more logical channels comprises performing a logical channel prioritization procedure based on the one or more priorities.

16. The wireless device of claim 11, wherein the processing together the first plurality of uplink grants comprises performing a logical channel prioritization procedure based on the one or more priorities.

17. The wireless device of claim 16, wherein the multiplexing the data from the one or more logical channels is based on the one or more coinciding transmission durations.

18. The wireless device of claim 11, wherein the second configuration parameters indicate a prioritized bit rate corresponding to a logical channel in the one or more logical channels.

19. The wireless device of claim 11, wherein the first plurality of uplink grants comprise a plurality of transmission parameters for the one or more transport blocks.

20. The wireless device of claim 11, wherein a third plurality of uplink grants in the first plurality of uplink grants indicate resources with one or more same transmission durations.

* * * * *